US008605710B2

(12) United States Patent
Bejerano et al.

(10) Patent No.: US 8,605,710 B2
(45) Date of Patent: Dec. 10, 2013

(54) METHOD AND APPARATUS FOR REDUCING CHANNEL CHANGE RESPONSE TIMES FOR IPTV

(75) Inventors: Yigal Bejerano, Springfield, NJ (US); Pramod V. N. Koppol, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 302 days.

(21) Appl. No.: 12/991,698

(22) PCT Filed: Jun. 3, 2008

(86) PCT No.: PCT/US2008/065623
§ 371 (c)(1),
(2), (4) Date: Nov. 9, 2010

(87) PCT Pub. No.: WO2009/148438
PCT Pub. Date: Dec. 10, 2009

(65) Prior Publication Data

US 2011/0061084 A1 Mar. 10, 2011

(51) Int. Cl.

| | |
|---|---|
| ***H04J 3/06*** | (2006.01) |
| *H04L 12/28* | (2006.01) |
| *H04J 3/26* | (2006.01) |
| *H04J 3/04* | (2006.01) |
| *H04J 3/22* | (2006.01) |
| *G06F 3/00* | (2006.01) |
| *H04N 5/445* | (2011.01) |
| *H04N 7/16* | (2011.01) |
| *G06F 13/00* | (2006.01) |
| *H04N 5/50* | (2006.01) |
| *H04N 5/06* | (2006.01) |
| *H04N 5/268* | (2006.01) |

(52) U.S. Cl.
USPC ........... 370/350; 370/390; 370/432; 370/535; 370/543; 725/38; 725/61; 725/135; 348/731; 348/521; 348/705

(58) Field of Classification Search
USPC ......... 370/350, 312, 390, 432, 503, 535, 536, 370/543; 725/38, 56, 61, 62, 109, 135; 348/731, 500, 518, 521, 734, 705–706, 348/565, 569, 563
See application file for complete search history.

(56) References Cited

U.S. PATENT DOCUMENTS

| | | | | |
|---|---|---|---|---|
| 2001/0052129 A1* | 12/2001 | Mehra | ............................. | 725/86 |
| 2006/0075428 A1 | 4/2006 | Farmer et al. | | |
| 2008/0092203 A1* | 4/2008 | Bouazizi et al. | .............. | 725/135 |

FOREIGN PATENT DOCUMENTS

| | | | |
|---|---|---|---|
| EP | 1 487 215 | A | 12/2004 |
| EP | 1 819 169 | A | 8/2007 |
| EP | 1 926 322 | A | 5/2008 |
| WO | WO 2004/114668 | A | 12/2004 |
| WO | WO 2006/057938 | A | 6/2006 |
| WO | WO 2008/041896 | | 4/2008 |

OTHER PUBLICATIONS

The International Search Report and the Written Opinion of the International Searching Authority, or The Declaration, mailed Jul. 2, 2009, in International Application No. PCT/US2008/065623, Lucent Technologies Inc. (now Alcatel-Lucent USA Inc.) et al., Applicant, 13 pages.

* cited by examiner

*Primary Examiner* — Hoang-Vu A Nguyen-Ba
(74) *Attorney, Agent, or Firm* — Wall & Tong, LLP

(57) ABSTRACT

A method and apparatus for improving a channel change response time are disclosed. A meta channel associated with an original and auxiliary media streams is generated. The information conveyed by the meta channel is propagated toward at least one user device. The user device may receive the meta channel information and select one of the media streams using the meta channel information in response to a channel change request from a user terminal, or a network device may select one of the media streams for a user terminal in response to a channel change request from the user terminal.

24 Claims, 12 Drawing Sheets

700

1100

METHOD AND APPARATUS FOR REDUCING CHANNEL CHANGE RESPONSE TIMES FOR IPTV

CROSS REFERENCE TO RELATED APPLICATIONS

This application is a 371 of International Application No. PCT/US2008/065623, filed Jun. 3, 2008, entitled METHOD AND APPARATUS FOR REDUCING CHANNEL CHANGE RESPONSE TIMES FOR IPTV, which prior application is incorporated herein by reference.

FIELD OF THE INVENTION

The invention relates to the field of communication networks and, more specifically, to channel zapping in Internet Protocol Television (IPTV) networks.

BACKGROUND OF THE INVENTION

Channel change response time, also known as channel zapping response time, is the time that is required for a user terminal to switch from one television channel to another television channel in response to a channel change request initiated by a user. In existing digital television systems, such as Internet Protocol Television (IPTV) systems, the channel zapping response time is often quite large (possibly even on the order of seconds). Disadvantageously, such large channel zapping response times significantly reduce the quality of experience (QoE) of users of digital television systems, who have often become accustomed to smaller channel zapping response times of traditional television systems.

While some mechanisms to improve zap response time have been proposed, these mechanisms fall short in one or more of the following dimensions: (1) the amount of additional bandwidth requirements imposed on the network, (2) the ability to efficiently dimension the network to handle worst case load, (3) the degree to which zap response time is lowered in the best, average, and worst case scenarios, (4) introduction of user-perceivable picture distortions resulting from the zap process, and (5) applicability of the mechanism to all types of access systems (e.g., cable television systems, digital subscriber line systems, and FTTx).

SUMMARY OF THE INVENTION

Various deficiencies in the prior art are addressed through the invention of a method and apparatus for improving a channel change response time. A method includes propagating a plurality of media streams toward at least one user terminal using a respective plurality of multicast groups and propagating a meta channel toward the at least one user terminal for conveying information adapted for use in selecting one of the media streams in a manner tending to improve the channel change response time. The media streams include an original media stream conveying media content and at least one auxiliary media stream, generated from the original media stream, where each of the at least one auxiliary media stream conveys the media content of the original media stream, where each of the at least one auxiliary media stream is offset in time with respect to the original media stream. The information conveyed by the meta channel is associated with the media streams. A user device may receive the meta channel information and select one of the media streams using the meta channel information in response to a channel change request from the user terminal, or a network device may select one of the media streams for a user terminal in response to a channel change request from the user terminal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
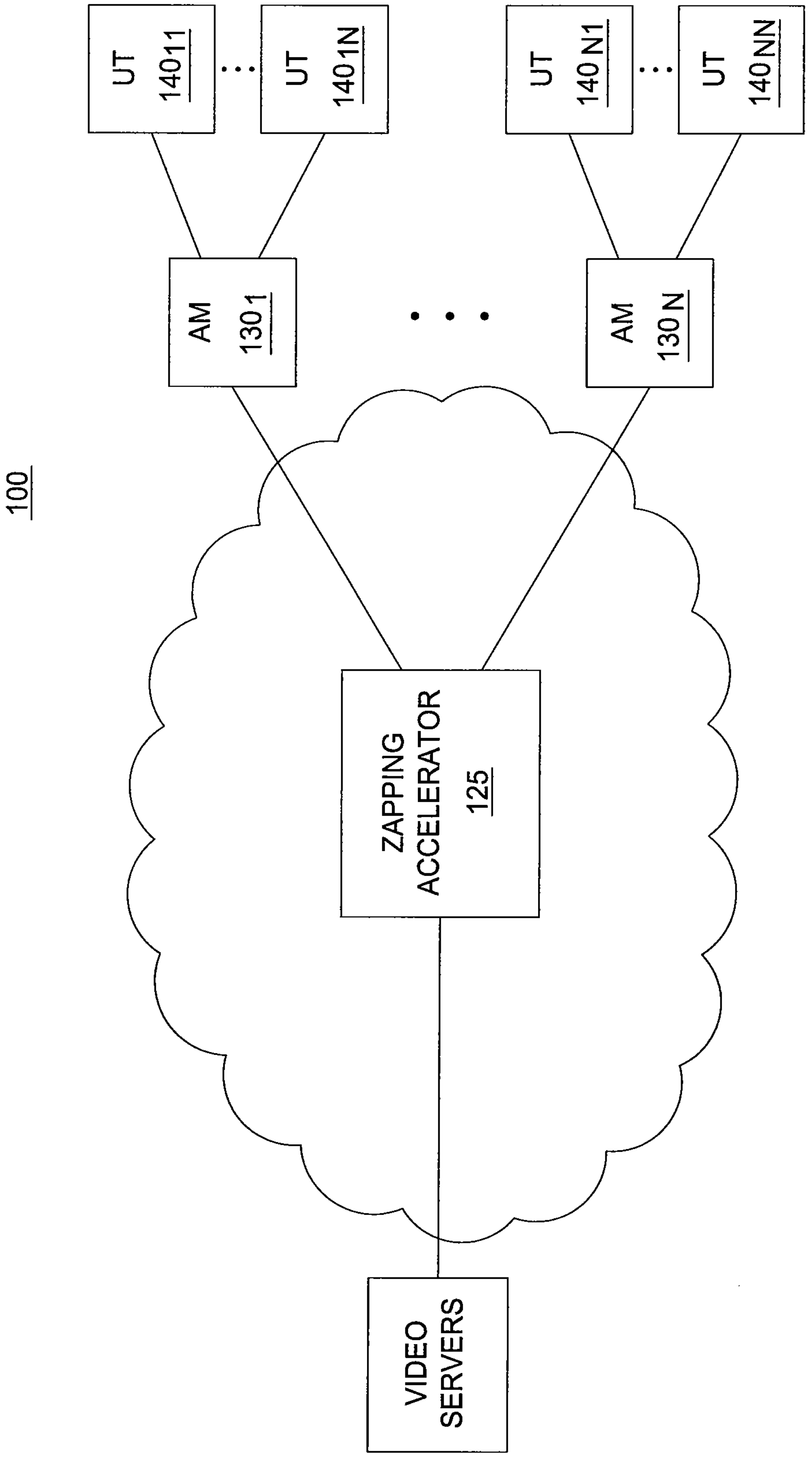
FIG. 1 depicts a high-level block diagram of an exemplary digital television network infrastructure.

The present invention enables improved channel zapping response times in digital television systems. The present invention uses one or more auxiliary media streams in addition to an original media stream to reduce the time between reference frames for user terminals, thereby reducing channel zapping response times experienced by users of the user terminals. Although primarily depicted and described herein with respect to MPEG media streams conveyed using an IPTV network infrastructure, channel zapping acceleration functions depicted and described herein are applicable to any media streams conveyed using any communication network.

An IPTV infrastructure is one in which the digital media streams are transported over an IP-based transport network. In an IPTV infrastructure, a television channel is typically transported over an IP multicast tree that is rooted at a video server (illustratively, VSs 110) and in which currently tuned-in user terminals (illustratively, ones of UTs 140) comprise leaf nodes of the IP multicast tree. When a user initiates a channel change operation (referred to herein as a channel zap, in which the user requests to be switched from a first television channel to a second television channel), the associated user terminal performs a leave operation to leave the multicast group of the first television channel and performs a join operation to join the multicast group of the second television channel.

The content of a television channel is propagated to user terminals as a media stream. The media stream of a television channel is propagated using the multicast group for that television channel (i.e., such that the media stream is propagated to each user terminal that is a member of the multicast group for that television channel. The media stream may be any type of media stream. For example, the media stream may be a Motion Pictures Expert Group (MPEG) media stream, a Microsoft Windows Media Video (WMV) media stream, a RealNetworks RealVideo media stream, and the like. For purposes of clarity in describing the channel zapping acceleration functions, the channel zapping acceleration functions are primarily depicted and described herein within the context of an IPTV infrastructure using MPEG media streams.

An MPEG media stream includes I-frames, P-frames, and B-frames, where, in general, an I-frame conveys a main picture and P-frames and B-frames associated with the I-frame convey increments to the picture conveyed by the I-frame, until the next I-frame. A group of pictures (GOP) refers to a segment of an MPEG media stream that includes an I-frame and the P-frames and B-frames associated with the I-frame. Since an I-frame (as well as some associated P-frames and B-frames) must be received by a user terminal before the user terminal can begin presenting the content of the media stream, in existing systems, in response to a channel change operation, a user terminal must wait until a next GOP before presenting the content of the television channel requested by the user via the channel change operation.

As described herein, channel zapping is the act of switching from one television channel to another television channel at a user terminal. The time it takes for channel zapping (often referred to as the channel zapping response time, or zap response time) is often a significant concern in digital television systems (e.g., such as the IPTV network of FIG. 1). There are two primary factors that contribute to the channel zapping response time. The first factor is the time required for the user terminal to leave one multicast group and join another multicast group, which is referred to as the signaling delay (SD). The second factor is the time required for a user terminal to receive enough data on a media stream to be able to begin presenting the content conveyed by the media stream.

The second factor includes two sub-factors. The first sub-factor is the first I-frame delay (FID), which is the length of time from the time that a user terminal joins a multicast group until the time that the first I-frame is received by the user terminal on that multicast group. The second sub-factor is the user terminal buffering delay (UBD), which is the length of time from the time that the user terminal receives the first I-frame until the user terminal is able to present the content to the user (since at least some of the P-frames and B-frames associated with the I-frame must be received before the user terminal may begin presenting the content). The UBD has little room for improvement. The channel zapping acceleration functions depicted and described herein enable significant reductions in the FID time, thereby resulting in a smaller channel zapping response time experienced by users.

FIG. 1 depicts a high-level block diagram of an exemplary digital television network infrastructure. Specifically, the digital television network infrastructure 100 of FIG. 1 includes a plurality of video servers (VSs) $\mathbf{110}_1$-$\mathbf{110}_N$ (collectively, VSs 110), a multicast-capable IP network (MIPN) 120, and a plurality of access multiplexers (AMs) $\mathbf{130}_1$-$\mathbf{130}_N$ supporting respective pluralities of user terminals (UTs) $\mathbf{140}_{11}$-$\mathbf{140}_{1N}$ through $\mathbf{140}_{N1}$-$\mathbf{140}_{NN}$ (collectively, UTs 140).

The VSs 110 are adapted for providing media content. The VSs 110 may provide any type of media content (e.g., television programs, movies, and the like, as well as various combinations thereof). In one embodiment, VSs 110 may receive at least a portion of the media content from other sources of such media content. In one embodiment, VSs 110 may store at least a portion of the media content locally. The VSs 110 are adapted to provide media content to UTs 140. The VSs 110 provide media content to UTs 140 via MIPN 120 and associated AMs 130. The VSs 110 provide media content to UTs 140 using media streams. The media streams may be any type of digital media streams adapted for conveying content (e.g., such as MPEG streams and the like).

In one embodiment, in an IPTV environment, VSs 120 generate one media stream for each television channel and propagate the generated media stream toward UTs 140. The VSs 120 may propagate a media stream toward UTs 140 using a broadcast media stream or a multicast media stream. If the content of a television channel is propagated using a multicast media stream, a multicast group is associated with the television channel such that UTs 140 may join the multicast group (in order to start receiving the content of that television channel) and leave the multicast group (in order to stop receiving the content of that television channel). The UTs 140 may join the multicast group using a multicast address associated with the multicast group.

The MIPN 120 is a network supporting multicast capabilities. Although omitted herein for purposes of clarity, MIPN 120 includes network elements supporting multicast capabilities (e.g., such as routers, switches, and the like, as well as various combinations thereof). The MIPN 120 supports propagation of media streams downstream from the VSs 110 to AMs 130 using multicast capabilities. The MIPN 120 supports propagation of signaling upstream from AMs 130 toward VSs 110. The MIPN 120 may include any types, numbers, and configurations of multicast nodes, depending on the needs/desires of the network provider.

The MIPN 120 includes a zapping accelerator (ZA) 125. The ZA 125 is adapted for providing channel zapping acceleration functions in a manner for reducing the channel zapping response time. The ZA 125 generates one or more time-shifted replicas of a media stream conveying content of a television channel, thereby reducing the length of time that a UT 140 must wait until a next reference frame (e.g., an I-frame, where MPEG is used) of the television channel is available for use by the UT 140 for presenting the content of the television channel in response to a channel change request. The ZA 125 also enables selection of one of the media streams (e.g., the original media stream or one of the replicas) in a manner that tends to reduce the channel zapping response time for a UT 140 in response to a channel change request by that UT 140.

As depicted in FIG. 1, in one embodiment, ZA 125 is deployed as a standalone element within MIPN 120 (i.e., between VSs 110 and AMs 130); however, ZA 125 may be deployed in various other ways (which may include use of one or more such ZA modules). In other embodiments, ZA 125 may be implemented on one or more of the network elements of MIPN 120. In other embodiments, ZA 125 may be implemented on VSs 110 (e.g., where each VS 110 supports channel zapping acceleration functions). In other embodiments, ZA 125 may be implemented on AMs 130 (e.g., where each MA 130 supports channel zapping acceleration functions). The channel zapping acceleration functions may be deployed in various other ways, as depicted and described herein.

The channel zapping acceleration functions supported by ZA 125 may be better understood by way of reference to FIG. 2-FIG. 11.

The AMs 130 provide access between MIPN 120 and UTs 140. As depicted in FIG. 1, each AM 130 serves a number of UTs 140. The AMs 130 are adapted for propagating media streams from VSs 110 toward UTs 140. The AMs 130 may also be adapted for performing other functions, including some channel zapping acceleration functions depicted and described herein. The AMs 130 may be adapted for processing signaling from UTs 140, as well as for propagating signaling from UTs 140 upstream (e.g., to nodes within MIPN 120 or even to VSs 110).

The access between AMs 130 and UTs 140 may be provided in a number of ways. In one embodiment, access may be provided using cable television (CATV) technology, in which case AMs 130 may be head-ends. In one embodiment, access may be provided using Digital Subscriber Line technology, in which case AMs 130 may be DSLAMs. In one embodiment, access may be provided using fiber-based access technology, in which case AMs 130 may be PON OTUs/ONUs. The access between AMs 130 and UTs 140 may be implemented in various other ways.

The UTs 140 may be any user terminals capable of supporting digital media streams. For example, UTs 140 may include set top boxes (STBs) and associated televisions. For example, UTs 140 may include computers that are capable of presenting digital media streams. For example, UTs 140 may include home gateway devices serving one or more associated digital media presentation devices (e.g., computers, televisions, and the like). The UTs 140 may include any other similar devices adapted for interacting with a digital television system to receive and present digital media streams.

Figure 2:
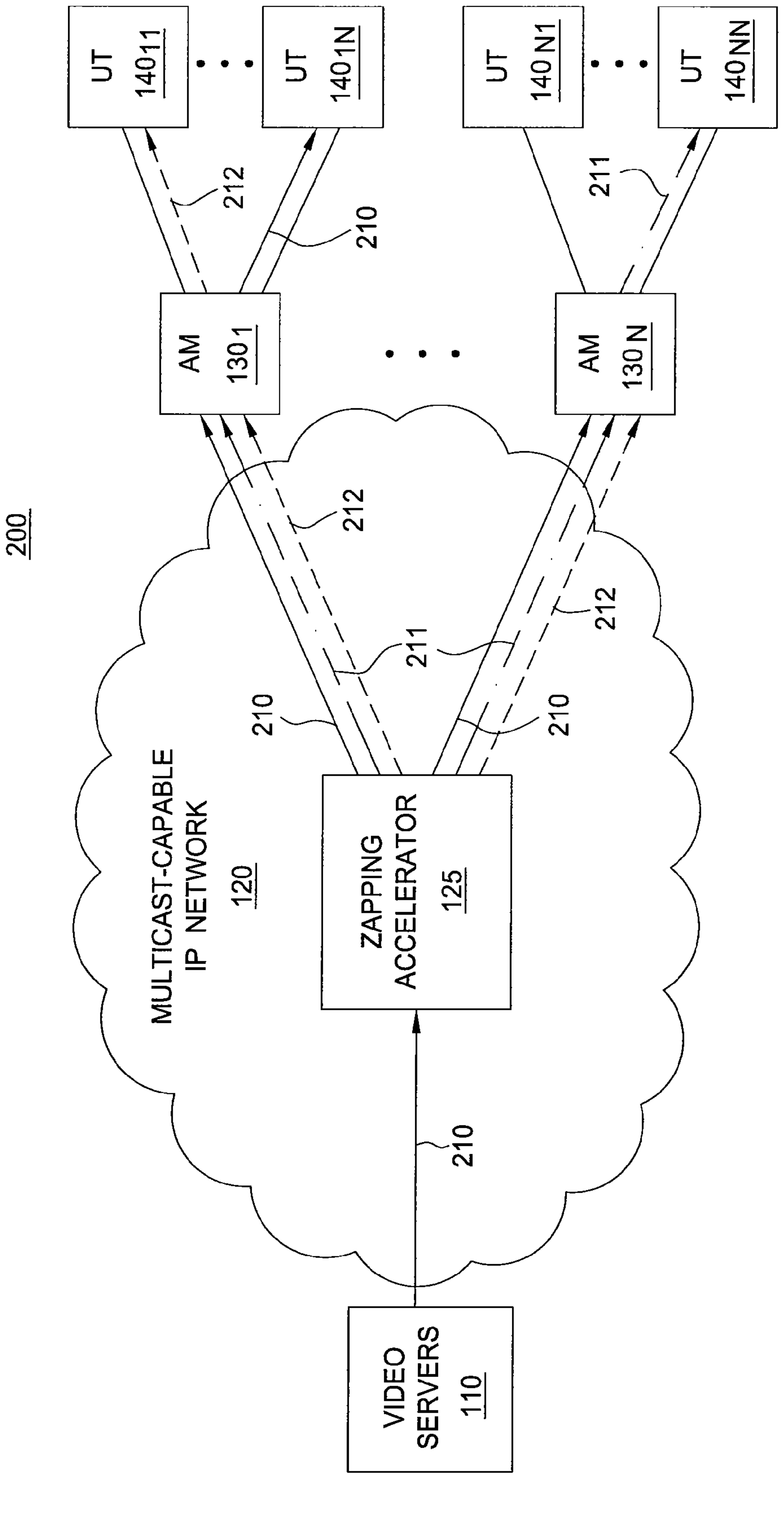
FIG. 2 depicts a high-level block diagram of the exemplary digital television network infrastructure of FIG. 1 in which auxiliary media streams are generated to complement a primary media stream for improving channel zapping response time.

FIG. 2 depicts a high-level block diagram of the exemplary digital television network infrastructure of FIG. 1 in which auxiliary media streams are generated to complement a primary media stream for improving channel zapping response time. As depicted in FIG. 2, VSs 110 propagate a primary media stream $\mathbf{210}_0$ to ZA 125. The primary media stream $\mathbf{210}_0$ conveys content for a television channel using a stream of packets. The ZA 125 receives primary media stream $\mathbf{210}_0$. The ZA 125 continues to propagate the primary media stream $\mathbf{210}_0$ toward the AMs 130 for distribution to the UTs 140. The ZA 125 generates one or more time-shifted replicas of primary media stream and propagates the time-shifted replicas toward AMs 130 for distribution to UTs 140.

In the example of FIG. 2, from primary media stream $\mathbf{210}_0$, the ZA 125 generates a first auxiliary media stream $\mathbf{210}_1$ and a second auxiliary media stream $\mathbf{210}_2$ (collectively, auxiliary media streams $\mathbf{210}_A$). The auxiliary media streams $\mathbf{210}_A$ convey content identical to the content that is conveyed by the primary media stream $\mathbf{210}_0$. The ZA 125 propagates auxiliary media streams $\mathbf{210}_0$ toward AMs 130 for distribution to UTs 140. As described herein, the primary media stream may be considered to be conveyed on a primary sub-channel and the auxiliary media stream(s) may be considered to be conveyed on respective auxiliary sub-channel(s). The primary media stream $\mathbf{210}_0$ and auxiliary media streams $\mathbf{210}_A$ are collectively referred to as media streams 210. The primary sub-channel and auxiliary sub-channels are collectively referred to herein as sub-channels.

The auxiliary media streams may be generated from a primary media stream in any manner. In one embodiment, when a packet p is received at ZA 125 from VSs 110, the packet p is stored in a buffer on ZA 125 for a duration d (which is predetermined). In this embodiment, assume that the time shift between each media stream is time shift t. In this embodiment, at the end of duration d, the packet p is propagated toward AMs 130 on the primary sub-channel, at the end of duration d+t the packet p is propagated toward AMs 130 on the first auxiliary sub-channel, at the end of duration d+2t, the packet p is propagated toward AMs 130 on the second auxiliary sub-channel, and so on, until the packet has been propagated on all auxiliary sub-channels for that television channel. This process is repeated at the ZA 125 for each packet of the primary media stream, for each auxiliary media stream generated for the television channel.

The media streams 210 are offset from each other in time by a fraction of the GOP length. This reduces the FID time for the television channel that is conveyed by media streams 210 since a user terminal requesting to receive the television channel has the option of joining one of the auxiliary media streams 210A (which will provide an I-frame sooner than the next I-frame that will be available on primary media stream $\mathbf{210}_0$), rather than having to wait until the next I-frame on the primary media stream $\mathbf{210}_0$. For example, assuming that the GOP length is approximately 750 ms, first auxiliary media stream $\mathbf{210}_1$ may be offset from (e.g., delayed with respect to) primary media stream $\mathbf{210}_0$ by 250 ms and second auxiliary media stream $\mathbf{210}_2$ may be offset from (e.g., delayed with respect to) the primary media stream $\mathbf{210}_0$ by 500 ms, such that an I-frame is available for that television channel every 250 ms rather than every 750 ms. The timing of media streams may be better understood with respect to FIG. 3.

The number of media streams supported for a television channel may depend on the largest GOP in the primary media stream. For example, for a given television channel, where s is the size (in time units) of the largest GOP in the media stream for the television channel, and T is the desired time shift, the maximum number of media streams supported for the television channel is s/T. In other words, there is flexibility in the granularity of the time between reference frames (e.g., I-frames) of the television channel (e.g., the time between reference frames of the television channel may be reduced by using a greater number of auxiliary media streams, at the expense of the increased number of auxiliary media streams which will consume additional bandwidth in the network).

The media streams 210 may be supported using multicast groups (i.e., one multicast group for each media stream). The different multicast groups are identified using unique multicast addresses (i.e., a different multicast address is assigned to each of the media streams propagated by ZA 125). This enables UTs 140 to join the multicast group associated with the media stream tending to minimize, or at least reduce, the channel zapping response time for the user terminal. The operations required for a user terminal to leave one multicast group (e.g., the multicast group associated with a media stream conveying the television channel that is user is changing from) and join another multicast group (e.g., the multicast group associated with one of the media streams that is conveying the television channel that the user is changing to) may be performed in any manner.

The ZA 125 enables a user terminal, in response to a channel change request at the user terminal, to join the multicast group associated with the sub-channel that is conveying the media stream tending to minimize the FID time for the user terminal and, thus, tending to minimize the channel zapping response time for the user terminal. The ZA 125 may enable the user terminal to join the optimum sub-channel in a number of ways, which may depend on a number of factors (e.g., the location of ZA 125 within the network, balancing between bandwidth constraints and signaling constraints, and the like, as well as various combinations thereof).

In one embodiment, ZA 125 generates selection information adapted for use in selecting one of the sub-channels tending to minimize the channel zapping response time. In one such embodiment, ZA 125 propagates the selection information to the user terminal for use by the user terminal in selecting one of the sub-channels in response to a channel change request. In another such embodiment, ZA 125 propagates the selection information to a downstream network component (e.g., the AM 130 that is serving the UT 140) for use by the downstream network component in selecting one of the sub-channels in response to a channel change request. The downstream network component may then propagate information indicative of the selected sub-channel to the user terminal for use by the user terminal in joining the multicast group of the selected sub-channel, or the downstream network component may transparently switch the user terminal to the multicast group of the selected sub-channel. The selection information may be propagated as a meta channel.

In one embodiment, ZA 125, in response to a channel change request from a user terminal, selects one of the sub-channels tending to minimize the channel zapping response time. In this embodiment, since ZA 125 selects one of the sub-channels using information adapted for use in selecting one of the sub-channels, the selection information may be considered to exist within ZA 125 (without being propagated between network elements). In one such embodiment, ZA 125 may propagate information indicative of the sub-channel selection to the user terminal for use by the user terminal to join the multicast group of the selected sub-channel. In another such embodiment, depending on where ZA 125 is implemented, ZA 125 may transparently switch the user terminal to the multicast group of the selected sub-channel, or may propagate information indicative of the sub-channel selection to a network component for use by the network component in transparently switching the user terminal to the multicast group of the selected sub-channel.

The channel zapping acceleration functions are primarily depicted and described herein with respect to embodiments in which the ZA 125 generates at least one auxiliary media stream from a primary media stream, propagates the primary and auxiliary media streams toward user terminals, generates a meta channel including information that is adapted for use by user terminals in selecting one of the media streams in response to a channel change request, and propagates the meta channel to user terminals. This embodiment may be better understood with respect to the exemplary embodiment depicted and described with respect to FIG. 3 and FIG. 4.

Figure 3:
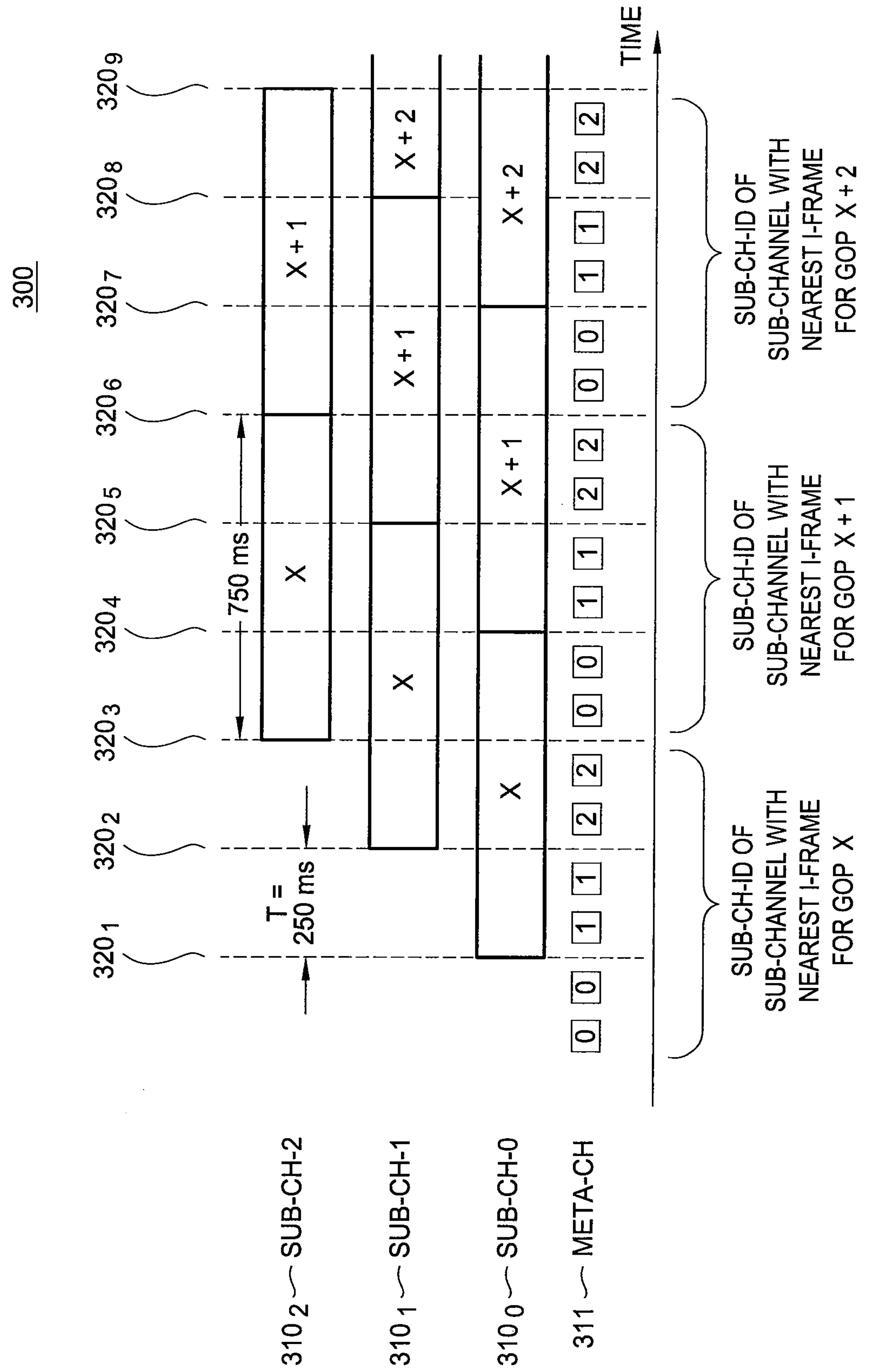
FIG. 3 depicts an exemplary timing diagram illustrating the timing of the primary sub-channel and associated auxiliary sub-channels of FIG. 2, as well as a meta channel associated with the sub-channels.

FIG. 3 depicts an exemplary timing diagram illustrating the timing of the primary sub-channel and associated auxiliary sub-channels of FIG. 2, as well as a meta channel associated with the sub-channels. As depicted in FIG. 3, the timing of a primary sub-channel 310$_0$ (denoted as SUB-CH-0, associated with primary media stream 210$_0$), a first auxiliary sub-channel 310$_1$ (denoted as SUB-CH-1, associated with auxiliary media stream 210$_1$), and a second auxiliary sub-channel 310$_2$ (denoted as SUB-CH-2, associated with second auxiliary media stream 210$_2$) with respect to each other, and with respect to an associated meta channel 311, is provided. The timing is represented within the context of a length of time including nine regions of time, where each of the time regions begins at an associated time point 320$_1$-320$_9$ (collectively, time points 320).

The media streams 210 associated with sub-channels 310 convey the same content (e.g., content of a television channel). The media streams 210 each convey GOPs, which include an I-frame and associated P-frames and B-frames. The GOPs are denoted as X, X+1, and X+2. As depicted in FIG. 3, each GOP is 750 ms long. As further depicted in FIG. 3, each time region is 250 ms long. The sub-channels 310 are offset from each other in time, where adjacent ones of the sub-channels 310 are offset by 250 ms. The first auxiliary sub-channel 310$_1$ lags primary sub-channel 310$_0$ by 250 ms. The second auxiliary sub-channel 310$_2$ lags the first auxiliary sub-channel 310$_1$ by 250 ms and, thus, lags the primary sub-channel 310$_0$ by 500 ms. The use of 250 ms increments is merely for purposes of clarity (i.e., various other lengths of time may be supported).

As depicted in FIG. 3, propagation of GOP X on primary sub-channel 310$_0$ begins at time point 320$_1$, propagation of GOP X on first auxiliary sub-channel 310$_1$ begins at time point 320$_2$, propagation of GOP X on second auxiliary sub-channel 310$_2$ begins at time point 320$_3$, propagation of GOP X+1 on primary sub-channel 310$_0$ begins at time point 320$_4$, and so on. As such, since the first frame of each GOP is an I-frame, the I-frame for GOP X for this television channel is available three different times, at time points 320$_1$, 320$_2$, and 320$_2$ (in contrast to existing systems in which auxiliary sub-channels are not available, in which case the I-frame for each GOP is only available once and, thus, if a user terminal joins a multicast group of a television station after the I-frame the user terminal would have to wait all the way until the beginning of the next GOP).

Thus, from FIG. 3 it may be seen that in the absence of first auxiliary sub-channel 310$_1$ and second auxiliary sub-channel 310$_2$, a user terminal requesting to change to this television channel may have to wait up to 750 ms before receiving the first I-frame for that television channel. By contrast, through use of first auxiliary sub-channel 310$_1$ and second auxiliary sub-channel 310$_2$, a user terminal requesting to change to this television channel would only have to wait up to approximately 250 ms before receiving the first I-frame for that television channel, as long as an optimum sub-channel is selected (e.g., taking into account the time at which the channel change request is detected, the timing of the sub-channels, the length of time required to join the multicast group of the selected sub-channel, and like factors).

The meta channel 311 provides information adapted for use by a user terminal in selecting one of the sub-channels 310 in response to a channel change request at the user terminal. In one embodiment, meta channel 311 conveys sub-channel selection information for one television channel. In another embodiment, meta channel 311 may convey sub-channel selection information for multiple different television channels. In one embodiment, meta channel 311 may be conveyed using a multicast group. A user terminal may join the multicast group of the meta channel 311 in response to detecting a channel change request (e.g., where meta channel 311 conveys information for one television channel), or may remain subscribed to the multicast group for meta channel 311 at all times (e.g., where the meta channel 311 conveys information for all television channels).

As described herein, meta channel 311 provides information adapted for use by user terminals in selecting one of the sub-channels 310 in response to a channel change request at the user terminal (denoted as sub-channel selection information). In one embodiment, meta channel 311 may provide information explicitly identifying which sub-channel 310 the user terminal should select at that instant in time (i.e., selection of the sub-channel 310 is performed in the network and communicated to the user terminal, e.g., by propagating the sub-channel identifier, a multicast address, and the like, as well as various combinations thereof). In one embodiment, meta channel 311 conveys information adapted for use by the user terminal in selecting which sub-channel 310 to use. In this embodiment, many different combinations of information may be provided in many different ways.

In one embodiment, sub-channel selection information provided on the meta channel 311 may be encoded such that the bandwidth requirement is independent of the number of sub-channels supported. This independence requires the assignment of different multicast group addresses to the sub-channels 310. In one embodiment, for example, an address pool may be preconfigured at the user terminal for each television channel. In this embodiment, the meta channel 311 may then include a base index into the address pool in order to enable the user terminal to identify the multicast address to use for the sub-channel selected by the user terminal using other information conveyed on meta channel 311.

In one embodiment, sub-channel selection information for a television channel is propagated using a sub-channel selection information message (which may be denoted herein as an STI message, or simply STI). In one embodiment, one sub-channel selection information message is provided on the meta channel 311 for each GOP in primary sub-channel $310_0$. The sub-channel selection information message is sent on meta channel 311 at least j time units before the I-frame for that GOP is sent on primary sub-channel $310_0$. In one embodiment, the sub-channel selection information messages for multiple different television channels may be packed into a single IP packet (in order to more efficiently accommodate IP header overhead more efficiently). In this embodiment, as described herein, a single meta channel 311 may be used for multiple television channels.

In one such embodiment, a sub-channel selection information message may be implemented as a five-tuple, as follows: (id, NI time, T, N, M id), where id identifies the television channel, NI time is the length of time until the next I-frame is sent on the primary sub-channel, T is the amount of the time-shift between adjacent sub-channels, N is the total number of sub-channels (including the primary sub-channel) for this television channel, and M id is the index into the pool of multicast addresses that is used to identify the multicast address of the selected sub-channel at the user terminal. The NI time should be at least as large as the time required for the user terminal to join the multicast group of the selected sub-channel (because otherwise, the user terminal will still miss the I-frame of the selected sub-channel and will have to wait until the I-frame of the next sub-channel).

Since sub-channel selection may be performed in many different ways using different sub-channel selection information, meta channel 311 depicted in FIG. 3 is depicted in a manner representative of the sub-channel on which the nearest I-frame is available. In other words, in each square of the meta channel 311 depicted in FIG. 3, the number in the square of meta channel 311 corresponds to the identifier of the sub-channel 310 on which the next I-frame is available. For example, between time points $320_1$ and $320_2$, since the GOP X has already been sent on primary sub-channel $310_0$, meta channel 311 indicates that the nearest I-frame for the GOP X is the first auxiliary sub-channel $310_1$. Similarly, for example, between time points $320_2$ and $320_3$, since the GOP X has already been sent on both the primary sub-channel $310_0$ and the first auxiliary sub-channel $310_1$, meta channel 311 indicates that the nearest I-frame for GOP X is the second auxiliary sub-channel $310_2$.

Although auxiliary sub-channel generation and propagation, and meta channel generation and propagation, are primary depicted and described herein within the context of an exemplary embodiment in which the zapping accelerator is implemented as a standalone system disposed between the video servers and the access multiplexers, and in which two auxiliary sub-channels (and, thus, two auxiliary media streams) are supported, auxiliary sub-channel generation and propagation, and meta channel generation and propagation may be implemented in various other ways. A method according to one exemplary embodiment is depicted and described herein with respect to FIG. 4.

Figure 4:
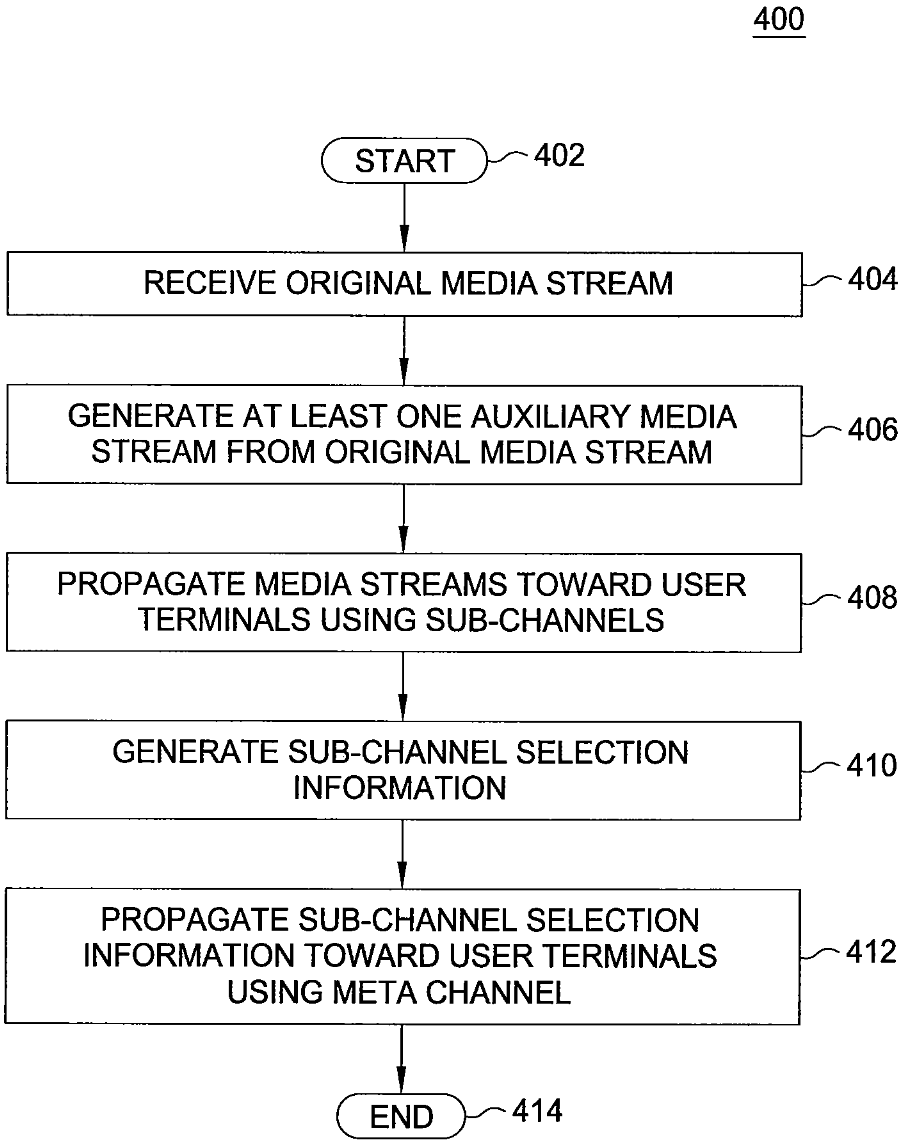
FIG. 4 depicts an exemplary method adapted to be performed by a zapping accelerator for providing improved channel zapping response time.

FIG. 4 depicts an exemplary method adapted to be performed by a zapping accelerator for providing improved channel zapping response time. Specifically, method 400 of FIG. 4 includes a method for generating and propagating media streams and an associated meta channel toward user terminals. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, an original media stream is received. The original media stream conveys content of a television channel. At step 406, at least one auxiliary media stream is generated from the original media stream. The at least one auxiliary media stream comprises at least one time-shifted replica of the original media stream conveying the same content as the original media stream. At step 408, the media streams (including the original and auxiliary media streams) are propagated toward access multiplexers using respective sub-channels.

At step 410, sub-channel selection information is generated. The sub-channel selection information may include any information adapted for use by a user terminal (and, in some other embodiments, a network component) in selecting one of the media streams that will provide the shortest channel zapping response time for the user terminal in response to a channel change request at the user terminal. At step 412, the generated sub-channel selection information is propagated toward the user terminals using a meta channel. At step 414, method 400 ends.

Figure 5:
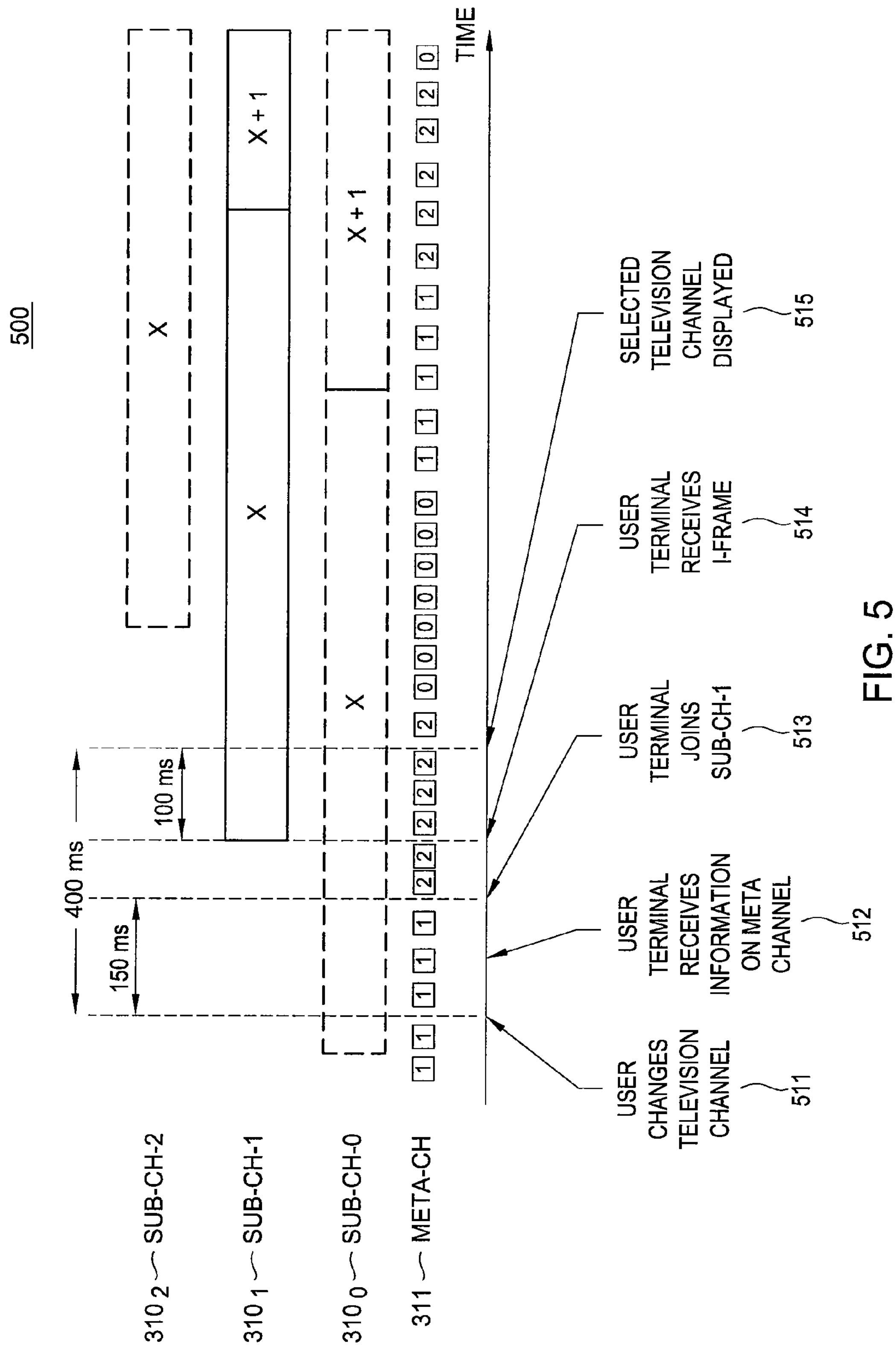
FIG. 5 depicts an exemplary timing diagram illustrating the timing of operations at a user terminal within the context of the timing of the primary and auxiliary sub-channels and the meta channel of FIG. 3.

FIG. 5 depicts an exemplary timing diagram illustrating the timing of operations at a user terminal within the context of the timing of the primary and auxiliary sub-channels and the meta channel of FIG. 3. As depicted in FIG. 5, the timing of primary sub-channel $310_0$, first auxiliary sub-channel $310_1$, and second auxiliary sub-channel $310_2$ is the same as depicted and described with respect to FIG. 3. Further, as depicted and described with respect to FIG. 3, the meta channel 311 conveys information adapted for use by a user terminal (illustratively, one of the UTs 140 of FIG. 1) for selecting one of the sub-channels in a manner tending to minimize the channel zapping response time in response to a channel change request at the user terminal.

As depicted in FIG. 5, the described actions are being performed at a user terminal, which is capable of joining a multicast group of any of the sub-channels which are conveying corresponding media streams and which is also capable of joining (or, alternatively, may already be joined to) a multicast group of a meta channel which is conveying sub-channel selection information adapted for use by the user terminal in selecting one of the sub-channels in a manner tending to reduce the channel zapping response time for the user terminal.

At a first point in time (denoted as 511), a user selects a television channel. For example, the user may change the television channel via a remote control.

At a second point in time (denoted as 512), after some delay from the first point in time, the user terminal receives information on the meta channel 311. The information received on the meta channel 311 includes information by which the user terminal may determine which of the sub-channels 310 to select for the television channel selected by the user.

In one embodiment, in which a single meta channel provides meta channel information for all television channels, the user terminal may remain tuned to the meta channel at all times (such that the user terminal does not need to join the multicast group of meta channel 311 in response to selection of the television channel by the user at the first point in time).

In one embodiment, in which different meta channels provide meta channel information for different television channels, the user terminal must join the multicast group of the meta channel associated with the selected television channel in order to receive the meta channel information (in this example, meta channel 311). For example, the user terminal may join a multicast group of the meta channel 311 using a multicast address of the multicast group (e.g., which may be preconfigured on the user terminal).

As depicted in FIG. 5, the user terminal receives the meta channel information on the meta channel 311 at a time at which the meta channel is conveying information indicative that first auxiliary sub-channel 310$_1$ is the sub-channel 310 that is capable of providing the best channel zapping response time for the user terminal.

As described herein, sub-channel selection may be performed in many ways.

In one embodiment, sub-channel selection may be performed by the user terminal using sub-channel selection information received on the meta channel 311. The sub-channel selection processing may be performed by the user terminal in many ways (which may depend on the information that is made available to the user terminal on meta channel 311).

In one embodiment, for example, in which meta channel 311 conveys five-tuple STIs described with respect to FIG. 3 (i.e., STIs of the format (id, NI time, T, N, M id)), the sub-channel selection processing may be performed by the user terminal as follows.

The user terminal receives STIs on meta channel 311 and retains at least the last two STIs (denoted as $STI_1$ and $STI_2$) for the selected television channel, as well as arrival times of the STIs (denoted as $t_1$ and $t_2$ for $STI_1$ and $STI_2$, respectively). If, during initialization, the user terminal has not yet received two STIs for the television channel, the user terminal will select the primary sub-channel 310$_0$, otherwise, additional sub-channel selection logic is applied as follows.

In this additional sub-channel selection logic, note the following: (1) there are N sub-channels (denoted as $SC_0$, $SC_1, \ldots, SC_{N-1}$, where $SC_0$ is the primary sub-channel), and (2) for every I-frame I on $SC_0$ at time $It_0$, I appears on $SC_j$, $1 \le j < N$, at time $It_j = It_0 + (j \times T)$. In one embodiment, letting $t_c$ denote the time at which the channel change request is received at the user terminal from the user, the objective is to determine the sub-channel $SC_k$ with the property that $It_{k-1} - J < t_c < It_k - J$, where $It_{k-1}$ and $It_k$ are the time periods in which I-frame I is stated to be transmitted on the sub-channels k−1 and k, respectively, and where J denotes the time required for the user terminal to join a multicast group. In other words, k is such that, at time $t_c$, it is too late for the user terminal to join the sub-channel $SC_{k-1}$ but it is early enough for the user terminal to join the sub-channel $SC_k$. The value of k may be calculated as follows:

$$(It_{k-1} - J) < t_c < (It_k - J) \quad \text{(Eq. 1)}$$

$$(It_0 + (k-1) \times T - J) < t_c < (It_0 + k \times T - J) \quad \text{(Eq. 2)}$$

$$k - 1 < \frac{t_c - It_0 + J}{T} < k \quad \text{(Eq. 3)}$$

$$k = \left\lceil \frac{t_c - It_0 + J}{T} \right\rceil \quad \text{(Eq. 4)}$$

In this embodiment, based on the calculation of k, the time to the next I-frame on sub-channel k is calculated as follows:

$$It_k = It_0 + (k \times T) - t_c \quad \text{(Eq. 5)}$$

In this embodiment, since the user terminal retains at least the last two (or more) STI messages, the user terminal can calculate the time for the next I-frame for each STI message as described hereinabove. Here, letting $t_i$ be the arrival time of the i-th STI message (denoted as $STI_i$) that includes the timing information for I-frame $I_i$ the user terminal calculates the sub-channel index $SCk(STI_i)$ and the time $tk_i$, which specify the closest sub-channel that provides I-frame $I_i$ and the corresponding time that I-frame $I_i$ will be sent on sub-channel $SC_k$, respectively.

In this embodiment, the user terminal begins by calculating the time that I-frame $I_i$ is provided on the primary sub-channel $SC_0$, which is calculated as follows: $It_0(STI_i) = t_i + \text{NI time}(STI_i)$. The user terminal then calculates the sub-channel index $SC_k(STI_i)$ and the time $tk_i$, which specify the closest sub-channel that provides I-frame $I_i$ and the corresponding time that I-frame $I_i$ will be sent on sub-channel $SC_k$, respectively, by using Eq. 4 and Eq. 5 depicted and described hereinabove. The user terminal then joins the multicast group of the sub-channel that minimizes the time that the user terminal must wait to receive I-frame $I_i$, by joining $SC_k(STI_i)$ for the $STI_I$ that satisfies the following equation:

$$STI_i = \arg\min_{STI_i} It_k(STI_i) \quad \text{(Eq. 6)}$$

In one embodiment, sub-channel selection may be performed within the network (e.g., at a standalone zapping accelerator, on an AM serving the user terminal that supports at least some zapping acceleration functions, or by another other network element or combination of network elements capable of performing such functions).

In one such embodiment, the network element which selects the media stream for a user terminal may provide information indicative of the selection to the user terminal, which the user terminal may then use to join the multicast group of the selected media stream. In one embodiment, for example, where sub-channel selection is performed within the network, the meta channel 311 may convey information that explicitly identifies the sub-channel that was selected for the user terminal (i.e., the user terminal is explicitly told which of the sub-channels 310 to join in order to minimize the channel zapping response time for the user terminal). For example, the meta channel 311 may convey the multicast address of the multicast group for the sub-channel selected for the user terminal. In this example, the user terminal may simply join the multicast group of the selected sub-channel without performing any of the above-described sub-channel selection processing).

In another such embodiment, the network element which selects the media stream for the user terminal may perform one or more actions adapted to switch the user terminal to the multicast group of the selected media stream in a manner that is transparent to the user terminal. In one embodiment, for example, where sub-channel selection is performed by an access multiplexer serving the user terminal, the access multiplexer may use multicast address rewriting at the access multiplexer to automatically provide, to the user terminal, the media stream associated with the sub-channel selected by the access multiplexer. In such embodiments, the meta channel is essentially rendered unnecessary (i.e., it does not need to be propagated to the user terminals), however, since the access multiplexer must perform some processing in order to select the sub-channel for the user terminal, the meta channel may be considered to exist within the access multiplexer.

As described hereinabove, FIG. 5 depicts an embodiment in which the sub-channel selection processing is performed at the user terminal using the sub-channel selection information provided in the meta channel. Returning to FIG. 5, the user terminal has joined the meta channel 311 at the second point in time.

At a third point in time (denoted as 513), after some delay from the second point in time (during which the user terminal is performing processing to select one of the available sub-channels and to join the multicast group of the selected sub-channel), the user terminal joins the selected sub-channel (which, in the example of FIG. 5, is first auxiliary sub-channel $\mathbf{310}_1$, denoted as SUB-CH-1). Since the user terminal must join the selected sub-channel before the next I-frame is available, the user terminal may then have to wait some period of time until the next I-frame is received on selected sub-channel SUB-CH-1.

At a fourth point in time (denoted as 514), after some delay from the third point in time, the user terminal receives the next I-frame on the selected sub-channel SUB-CH-1 (illustratively, the I-frame of GOP X). As described herein, however, the user terminal can not yet display the content conveyed by the media stream of selected sub-channel SUB-CH-1 because the content cannot be displayed using only the I-frame. Rather, the user terminal must wait some period of time, until at least some of the P-frames and B-frames of GOP X are received, before displaying the television channel selected by the user.

At a fifth point in time (denoted as 515), after some delay from the fourth point in time (during which the user terminal receives some of the P-frames and B-frames associated with the received I-frame), the user terminal display the content conveyed by the media stream of selected sub-channel SUB-CH-1 (i.e., the user terminal displays the television channel selected by the user. As depicted in FIG. 5, the user terminal waits approximately 100 ms between the time that the I-frame is received and the time that the television channel is displayed to the user.

As depicted in FIG. 5, the improvement in channel zapping response time due to the channel zapping accelerator functions is clear.

In the absence of such channel zapping accelerator functions, the user terminal would have had to wait almost the entire length of GOP X (from time point 511 when the user changed the television channel, until the start of GOP X+1 on primary sub-channel 3100), plus additional time after receiving the I-frame of GOP X+1 (i.e., the time required for the user terminal to receive the P-frames and B-frames required for the user terminal to display the television channel), before the television channel could be displayed to the user. Thus, in the example of FIG. 5, assuming a GOP length of 750 ms, and assuming a 100 ms UBD time, in the absence of channel zapping accelerator functions, the user would have had to wait approximately 800 ms from the time the user requested the channel change until the time that the request channel was displayed for the user.

By contrast, in the example of FIG. 5, assuming GOP length of 750 ms, assuming use of two auxiliary media streams, and assuming a 100 ms UBD time, using channel zapping accelerator functions, the user would only have to wait approximately 400 ms from the time the user requested the channel change until the time that the request channel was displayed for the user. Thus, using such channel zapping accelerator functions, the channel zapping response time experienced by users may be significantly reduced without any significant increase in network bandwidth requirements or access bandwidth requirements.

Figure 6:
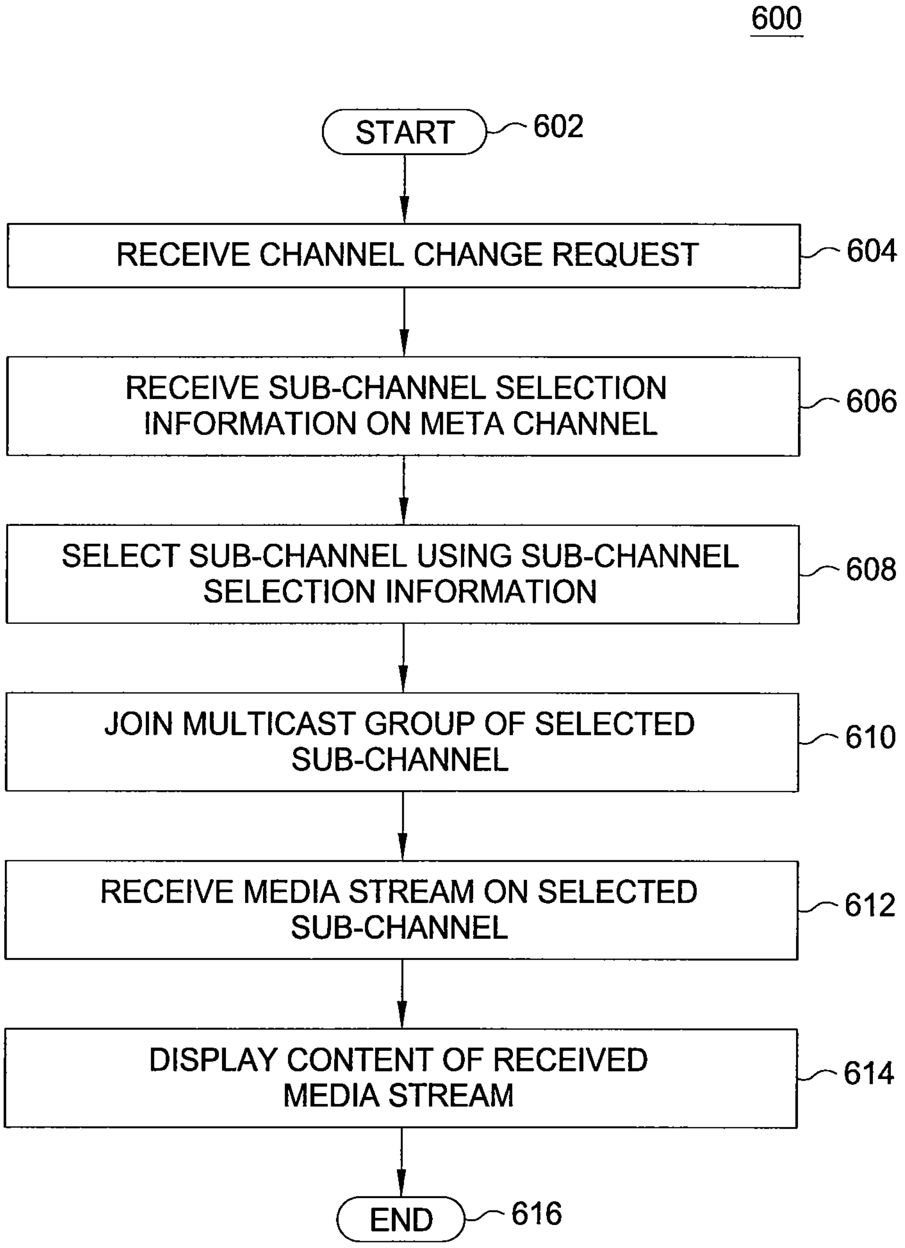
FIG. 6 depicts an exemplary method adapted to be performed by a user terminal for improving channel zapping response time.

FIG. 6 depicts an exemplary method adapted to be performed by a user terminal for improving channel zapping response time. Specifically, method 600 of FIG. 6 includes a method for selecting one of a plurality of media streams using information conveyed in a meta channel. Although depicted and described as being performed serially, at least a portion of the steps of method 600 may be performed contemporaneously, or in a different order than depicted and described with respect to FIG. 6. The method 600 begins at step 602 and proceeds to step 604.

At step 604, a channel change request is received (e.g., from a user via a user interface, such as a television remote control).

At step 606, sub-channel selection information is received on a meta channel. As described herein, depending on the implementation, the user terminal may already be joined to a multicast group of a meta channel that is conveying sub-channel selection information for all available television channels, or the user terminal may have to join a multicast group of a meta channel that is conveying sub-channel selection information for the television channel requested by the user.

At step 608, a sub-channel (of a plurality of sub-channels that includes a primary sub-channel and at least one auxiliary sub-channel) is selected using the sub-channel selection information. The sub-channel is selected in a manner tending to minimize the channel zapping response time for the user terminal. The sub-channel may be selected in many ways.

At step 610, the multicast group of the selected sub-channel is joined. The multicast group of the selected sub-channel may be joined in a number of ways.

In one embodiment, the user terminal may join the multicast group of the selected sub-channel using multicast address information preconfigured on the user terminal and/or multicast address information received at the user terminal via the meta channel. For example, information received on the meta channel may provide an index into an group of multicast addresses configured on the user terminal.

In one embodiment, the user terminal may signal the network providing an indication of the sub-channel that was selected by the user terminal, and, in response, the network performs some action(s) to switch the user terminal to the selected sub-channel (e.g., by using address rewriting at the access multiplexer that is serving the user terminal such that the user terminal is switched to the selected sub-channel).

At step 612, the media stream is received on the selected sub-channel. The media stream conveys the content of the television channel requested by the user. The media stream may convey the content of the television channel in any manner for conveying such content (e.g., using any media encoding, any transport protocols, and the like, depending on the implementation).

At step 614, the content of the received media stream is displayed at the user terminal. The user terminal may display the content of the received media stream in any manner (e.g., a STB provides the content for display on a television, a home gateway device provides the content for display on a computer monitor, and the like).

At step 616, method 600 ends. Although depicted and described as ending (for purposes of clarity), various other actions and/or functions may be performed and/or provided. For example, method 600 may be repeated in response to additional channel change requests. For example, the user terminal may be migrated from an auxiliary sub-channel to the primary sub-channel for purposes of conserving network bandwidth. Various other actions and/or functions may be provided.

In preceding discussions, for purposes of clarity, an implicit assumption has been that all of the sub-channels, for every television channel, are always active and, thus, consuming network resources. Since maintaining all possible sub-channels at all times may be wasteful, in one embodiment a sub-channel is activated only if there is at least one user terminal that can benefit from the sub-channel.

In one such embodiment, the user terminal receives sub-channel selection information via the meta channel such that the user terminal thinks that all of the sub-channels are active as it performs the sub-channel selection process (i.e., the dynamic activation/deactivation of auxiliary sub-channels is transparent to the user terminal). At the zapping accelerator (i.e., the network element at which the auxiliary sub-channels are generated for the primary sub-channel), however, a media stream is propagated on the auxiliary sub-channel of that media stream only if there is at least one user terminal that has joined the corresponding multicast group for that sub-channel.

In one embodiment, the device performing sub-channel selection for a user terminal receives sub-channel selection information via the meta channel such that the device performing sub-channel selection for the user terminal thinks that all of the sub-channels are active as it performs the sub-channel selection process. At the zapping accelerator (i.e., wherever auxiliary sub-channels are generated for the primary sub-channel), however, a media stream is propagated on the auxiliary sub-channel for that media stream only if there is at least one user terminal that has joined the multicast group for that sub-channel.

In this embodiment, since the auxiliary sub-channel that is selected by a user terminal may not be activated (e.g., where the user terminal is the first user terminal to select that sub-channel), there is no corresponding multicast group which the user terminal may join and, therefore, the user terminal must provide an indication to the network that the selected sub-channel needs to be activated. In this embodiment, rather than simply joining the multicast group of the selected sub-channel, the user terminal signals the network to inform the network that the selected sub-channel needs to be activated. The costs associated with this upstream signaling from the user terminal will depend on the location of the zapping accelerator (i.e., depending on how deep into the network the sub-channel activation function is performed).

In one embodiment, in which the zapping accelerator is implemented on the access multiplexer, the upstream signaling adds negligible additional signaling delay. In other embodiments, in which the zapping accelerator is implemented upstream of the access multiplexer, the additional signaling delay will depend on a number of factors (e.g., how far into the network the zapping accelerator is situated, the size of the network, and the like, as well as various combinations thereof. In general, as the zapping accelerator moves closer to the video servers, the time required to setup the multicast tree (for the selected sub-channel) in the network becomes greater.

In one embodiment, one or more functions may be supported in order to reduce the impact of the additional signaling delay and multicast tree setup costs.

In one embodiment, for example, a pinned-down multicast tree may be employed to reduce the multicast tree setup time. In one such embodiment, forwarding entries are preconfigured on the network elements of the multicast network prior to the time at which a sub-channel is activated, but data is not propagated on the multicast tree until the sub-channel is activated (i.e., until at least one user terminal joins the multicast group for that multicast tree).

In one embodiment, for example, in which pinned-down multicast trees are used to reduce multicast tree setup time, the pinned-down multicast tree is only preconfigured on network elements of the multicast network that will operate as branch points of the multicast tree. This ensures that data flows on the branch of the multicast tree only when there is at least one user terminal hanging off that branch of the multicast tree.

In one embodiment, for example, logical single-hop paths may be employed to reduce the multicast tree setup time. In one such embodiment, a logical single-hop path may be provisioned between the zapping accelerator and each access multiplexer of the multicast network. In this embodiment, data forwarding is enabled on a logical hop only when there is at least one user terminal (served by the access multiplexer) that is requesting to join the multicast group.

Although the dynamic sub-channel activation/deactivation functions are primarily depicted and described herein with respect to embodiments in which the user terminal performs the sub-channel selection processing, the dynamic sub-channel activation/deactivation functions may also be employed in other embodiments in which sub-channel selection processing is not performed by the user terminal. In one embodiment, for example, in which the sub-channel selection for a user terminal is performed by the access multiplexer serving the user terminal, the dynamic sub-channel activation/deactivation functions may be adapted accordingly (e.g., such that the meta channel is provided to the access multiplexers in a manner that makes activation/deactivation of the sub-channels transparent to the access multiplexers).

In preceding discussions, for purposes of clarity, an implicit assumption also has been that once a user terminal has joined a sub-channel (regardless of whether it is the primary sub-channel or one of the auxiliary sub-channels), the user terminal remains joined to that sub-channel. Since it is desirable to activate a sub-channel only when there is at least one user terminal that can benefit from the sub-channel, it is also desirable to deactivate a sub-channel, if possible, to reduce the network resources that are consumed. As such, in one embodiment, each user terminal associated with an auxiliary sub-channel of a television channel will be migrated from the auxiliary sub-channel of the television channel to the primary sub-channel of the television channel so that the auxiliary sub-channel can be deactivated.

In order to migrate a user terminal from an auxiliary sub-channel to associated primary sub-channel, the auxiliary sub-channel (which initially lags the primary sub-channel in time) must be made to eventually lead the primary sub-channel in time. The auxiliary sub-channel is made to lead the primary sub-channel so that enough data may be accumulated at the user terminal prior to migration so that the user terminal may use the accumulated data to continue to display the content while the user terminal leaves the multicast group of the auxiliary sub-channel and joins the multicast group of the primary sub-channel. Thus, the auxiliary sub-channel should be leading the primary sub-channel for at least the time required to accumulate the required data before the migration is initiated.

In other words, as described hereinabove, each auxiliary sub-channel lags the primary sub-channel in the sense that, at a user terminal, for a given GOP, the GOP begins arriving on the primary sub-channel before the GOP arrives on any auxiliary sub-channel. The lag time is at least the time shift T. In order to migrate from an auxiliary sub-channel (denoted as sub-channels $SC_j$, $2 \le j \le N$) to the primary sub-channel (denoted as M), the auxiliary sub-channel $SC_j$ must first be made to catch the primary sub-channel M in time (i.e., such that that is a point in time when the arriving data on $SC_j$ and M is the same) and, further, the auxiliary sub-channel $SC_j$ must then be made to lead the primary sub-channel M in time in the sense that a GOP begins to arrive on auxiliary sub-channel $SC_j$ before arriving on primary sub-channel M.

Additionally, as described hereinabove, when a packet p arrives at the zapping accelerator, the packet p is delayed by d time units before being sent on the primary sub-channel M. In one embodiment, for purposes of clarity, assume that d>>J, where J is an upper bound on the length of time required for the user terminal to join a multicast group. Thus, before the migration of the user terminal is initiated, the auxiliary sub-channel $SC_j$ must be leading the primary sub-channel M for at least J time units, in order to allow accumulation of at least J time units of data from the auxiliary sub-channel $SC_j$ on the user terminal. The J time units of accumulated data operate as a jitter buffer at the user terminal in order to make the migration operation transparent to the user.

The generation of an auxiliary sub-channel such that the auxiliary sub-channel initially lags the primary sub-channel in time and then eventually leads the primary sub-channel in time may be performed in a number of ways.

In one embodiment, for example, an auxiliary sub-channel may be made to use a data rate that is greater than the data rate of the associated primary sub-channel such that, over time, the auxiliary sub-channel moves from lagging the primary sub-channel in time to leading the primary sub-channel in time.

In one embodiment, for example, GOP sizes of respective GOPs that are conveyed on an auxiliary sub-channel may be reduced by selectively discarding certain frames of the GOPs such that, over time, the auxiliary sub-channel moves from lagging the primary sub-channel in time to leading the primary sub-channel in time. In this embodiment, frames should be discarded in such a way that there is little or no user-perceivable picture degradation.

In other words, any technique by which the respective GOP sizes of GOPs of the auxiliary media stream of an auxiliary channel are compressed in terms of time may be used to ensure that, over time, the auxiliary sub-channel changes from lagging the primary sub-channel in time to leading the primary sub-channel in time.

For purposes of clarity in describing migration of a user terminal from an auxiliary sub-channel to the associated primary sub-channel, migration is primary depicted and described herein within the context of embodiments in which the data rate of the auxiliary sub-channel is made greater than the data rate of the associated primary sub-channel. In the following description, the auxiliary sub-channels are referred to as high-rate sub-channels (HRSs). An embodiment for migrating a user terminal(s) from an auxiliary sub-channel to a primary sub-channel using HRSs is described in detail hereinbelow.

A primary sub-channel (denoted as M) is created as described herein (i.e., when a packet p is received at the zapping accelerator, the packet p is delayed d time units and then propagated on primary sub-channel M, thereby forming the primary media stream). Let $C_m$ be the creation time of primary sub-channel M (i.e., d time units after a first packet p arrives at the zapping accelerator). In addition to primary sub-channel M, X number of HRSs are generated to supplement primary sub-channel M (where $X=\lceil s/T \rceil$, where s is the duration of the largest GOP in the media stream and T is the time shift described herein). Thus, creation time, $C_i (1 \le i \le X)$, of $HRS_i$ is $C_m+(i \times T)$ and packet p is sent on $HRS_i$ at time $C_i$.

With respect to the speedup of the HRSs such that the HRSs switch from lagging primary sub-channel M to leading primary sub-channel M, let $\Delta=(R/r)-1$ be the amount of speedup that is needed for each $HRS_i$ relative to primary sub-channel M. Due to this speedup, each of the HRSs, while initially lagging behind primary sub-channel M, will eventually catch up with and then lead primary sub-channel M until the HRSs are deactivated (after all of the user terminals have been migrated from the HRSs to primary sub-channel M). The time required for an auxiliary sub-channel $HRS_i$ to catch up with primary sub-channel M is $(C_i-C_m)/\Delta$.

Further with respect to speedup of the HRSs, when $HRS_0$ catches up with primary sub-channel M, a new HRS, $HRS_x$ is created, and has a creation time of $C_X=C_{X-1}+T/\Delta$. Note that $HRS_1$ takes $T/\Delta$ time to catch up with primary sub-channel M. Similarly, $HRS_2$ takes another $T/\Delta$ time units to catch up with primary sub-channel M, and so on. Thus, in general, when HRS; catches up with primary sub-channel M (which happens after a time of $T/\Delta$ after $HRS_{i-1}$ catches up with primary sub-channel M), a new auxiliary sub-channel $HRS_{i+X}$ is created and the initial gap between $HRS_{i+X}$ and primary sub-channel M is exactly $X \cdot T$ (the maximum duration of a GOP rounded up to an integer number of T intervals). In other words, at the creation time $C_{i+X}$ of $HRS_{i+X}$, the auxiliary sub-channel $HRS_{i+X}$ sends the packet p that was sent on primary sub-channel M at time $C_{i+X}-X \cdot T$.

With respect to speedup of the HRSs, from the above description (including the fact that the HRSs are spaced T time units apart), it follows that the maximum number of lagging auxiliary sub-channels is given by $\lceil s/T \rceil$ and the maximum number of leading auxiliary sub-channels is given by $\lceil J/(\Delta \times T) \rceil$. In other words, once these bounds are reached, every $T/\Delta$time units, one of the existing leading HRSs is deactivated and a new lagging HRS is activated. As such, the number of auxiliary sub-channels that is available for use by user terminals to reduce channel zapping response time is maintained (if needed or desired) while also enabling user terminals to be migrated off of auxiliary sub-channels onto the associated primary sub-channel.

The time of transmission of a packet on the HRSs may be calculated in a number of ways. A description of an exemplary process of calculating time of transmission of a packet on HRSs follows.

In this embodiment, let $C_i$ be the creation time of $HRS_i$. A goal is to ensure that each $HRS_i$ satisfies a requirement of a given time gap $\theta_I$ between auxiliary sub-channel $HRS_i$ and primary sub-channel M at the time of its creation $C_i$. For example, the first auxiliary sub-channel $HRS_1$ must satisfy an initial time gap of $\theta_1=T$ at time $C_1$, meaning that the zapping accelerator needs to send on HRS1 at time $C_1$ the packet that was sent on primary sub-channel M at time $C_m=C_1-T$. This may be generalized across all of the auxiliary sub-channels $HRS_i$ by defining, for each $HRS_i$, a time gap function $H_i(t)$ that specifies the time gap between $HRS_i$ and primary sub-channel M at time t (i.e., $HRS_i$ needs to send at time t the packet (bits) that were sent on M at time $t-H_i(t)$).

The time gap function $H_i(t)$ is a linear function satisfying the following constraints: (1) $H_i(C_i)=\theta_1$; and (2) from the different transmission rates of the primary sub-channel M and the auxiliary sub-channel $HRS_i$, auxiliary sub-channel $HRS_i$ catches up to primary sub-channel M at $\theta_I/\Delta$ time units after $C_i$ (i.e., $H_i(C_i+\theta_I/\Delta)=0$). Note that a positive value of $\theta_I$ indicates that the auxiliary sub-channel $HRS_i$ is lagging primary sub-channel M, and a negative value of $\theta_I$ indicates that the auxiliary sub-channel $HRS_i$ is leading primary sub-channel M. From these constraints, the following result is obtained: $H_i(t)=\Delta(C_i-t)+\theta_I$.

This result may be applied to two different cases. First, consider the case of the first X HRSs. In this case, each auxiliary sub-channel $HRS_i$ is created at time $C_i=C_m+(i\times T)$ and its initial time gap from primary sub-channel M at that time is $\theta=i\times T$. Thus, $H_i=\Delta(C_i-t)+(i\times T)$. Second, consider the case of another auxiliary sub-channel $HRS_i$ (i>X) after the first X HRSs. This $HRS_i$ is created at time $C_i$ when $HRS_{i+X}$ is aligned with primary sub-channel M and becomes a leading auxiliary sub-channel. As such, in order to preserve the requirement that at any period of T time units a beginning of an I-frame is sent by at least one sub-channel, $HRS_i$ must satisfy the requirement that at time $C_i$ it follows that $\theta_I=X\cdot T$.

In other words, based on this requirement, the packet that is sent on primary sub-channel M at time $C_i$ was sent on primary sub-channel M at time $C_i-X\cdot T$. Thus, $H_i(t)=\Delta(C_i-t)+X\cdot T$. Similarly, the time $t_i$ when a packet is transmitted on auxiliary sub-channel $HRS_i$ given that the packet is transmitted on primary sub-channel M at time tm may be calculated. Recalling that $t_m=t_i-H_i(t_i)=t_i-\Delta(C_i-t_i)-\theta_i$, the time $t_i$ may be calculated as follows: $t_i=[t_m+\Delta\hat{t}_i+\theta_i]/[1+\Delta]$. From this it follows that:

$$t_i = \frac{t_m + \Delta C_i + \theta_i}{1+\Delta}, \text{ for first } X \ HRSs$$

Thus, the times $t_i$ for each of the first X HRSs and the time(s) $t_i$ for any other $HRS_i$ (i>X) may be calculated as follows (recalling that although a new auxiliary sub-channel is created every T/Δ time units, the initial gap of the newly created auxiliary sub-channel from the primary sub-channel M is always X·T):

$$t_i = \frac{t_m + \Delta \cdot C_i + i \cdot T}{1+\Delta}, \text{ for first } X \ HRSs$$

$$t_i = \frac{t_m + \Delta \cdot C_i + X \cdot T}{1+\Delta}, \text{ for other } HRSs \ (i > X)$$

In order to enable selection of HRSs in a manner for minimizing channel zapping response time (e.g., by the user terminals, by the access multiplexer, and the like), additional information must be propagated on the meta channel associated with the television channel for which the HRSs are available. In one embodiment, in which HRSs are supported, the sub-channel selection information message propagated on the meta channel for enabling selection of the HRSs may include different and/or additional information as compared with information included in the five-tuple sub-channel selection information message described herein. The generation and propagation of the sub-channel selection information message may be performed in a manner similar to that described hereinabove.

In one embodiment, in which HRSs are supported, the sub-channel selection information message may be implemented as an eight-tuple, as follows: (id, gap1, Lgap, T, LLSC, L, N, M id), where id identifies the television channel, gap1 is the length of time until the next I-frame is sent on the primary sub-channel, Lgap is the difference between the time the next I-frame is going to be transmitted on the primary sub-channel M and the LLSC, LLSC is the identifier of the least lagging auxiliary sub-channel, L is the number of lagging auxiliary sub-channels, T is the amount of the time-shift between adjacent sub-channels, N is at least as large as the worst cast number of sub-channels and is used as a modulo operand to the identifiers of the respective auxiliary sub-channels for the, L lagging auxiliary sub-channels, and M id is the index into the pool of multicast addresses used to identify the multicast address of the selected sub-channel at the user terminal. In this embodiment, the id is computed as follows: (LLSC+i)modN, 1≤i≤L.

As described herein, once an auxiliary sub-channel catches up to the primary sub-channel, the auxiliary sub-channel must remain active for at least a duration which allows a user terminal to gather enough of a jitter buffer (i.e., buffer enough packets of the media stream) to be able to leave the multicast group of the auxiliary sub-channel and join the multicast of the primary sub-channel without any noticeable impact to the user. In general, gathering of the jitter buffer at the user terminal depends on the playout rate of the decoder in the user terminal (which is essentially r, the rate of the primary sub-channel M).

Thus, in order for the user terminal to gather a jitter buffer sufficient to support the maximum time J that is required for the user terminal to leave the auxiliary sub-channel and join the primary sub-channel M, the user terminal must continue to receive and buffer data from the auxiliary sub-channel for a duration of J/Δ, after which time the auxiliary sub-channel may be deactivated. In one embodiment, the auxiliary sub-channel is deactivated immediately after duration J/Δ. In one embodiment, the auxiliary sub-channel may remain active for additional time beyond duration J/Δ (e.g., for a grace period intended to deal with any potential retransmissions on the auxiliary sub-channel).

In sub-channel migration, a user terminal may not be able to determine when to migrate from an auxiliary sub-channel to the primary sub-channel. Thus, in one embodiment, the zapping accelerator may facilitate this decision at the user terminal. In one such embodiment, for example, in response to a determination that user terminals on an auxiliary sub-channel can be migrated to the primary sub-channel (i.e., the auxiliary sub-channel is now leading the primary sub-channel by a sufficient amount of time), the zapping accelerator may provide a migration indicator to user terminals receiving the auxiliary sub-channel to trigger the user terminals to leave the multicast group of the auxiliary sub-channel and join the multicast group of the primary sub-channel.

The migration indicator may be provided in a number of ways.

In one embodiment, for example, the zapping accelerator may provide the migration indicator to the user terminals without using the auxiliary sub-channel. For example, the zapping accelerator may provide the migration indicator to the user terminals that are using the auxiliary sub-channel using some other signaling. In such embodiments, the zapping accelerator requires knowledge of which user terminals are currently receiving the auxiliary sub-channel. The zapping accelerator may obtain this information from the membership of the multicast group of the auxiliary sub-channel.

In one embodiment, for example, the zapping accelerator may provide the migration indicator on the auxiliary sub-channel such that any user terminal that is currently using the auxiliary sub-channel receives the migration indicator. In one such embodiment, for example, the zapping accelerator may transmit a migration indicator packet on the auxiliary sub-channel. In such embodiments, the zapping accelerator does not require knowledge of which user terminals are currently receiving that auxiliary sub-channel.

Figure 7:
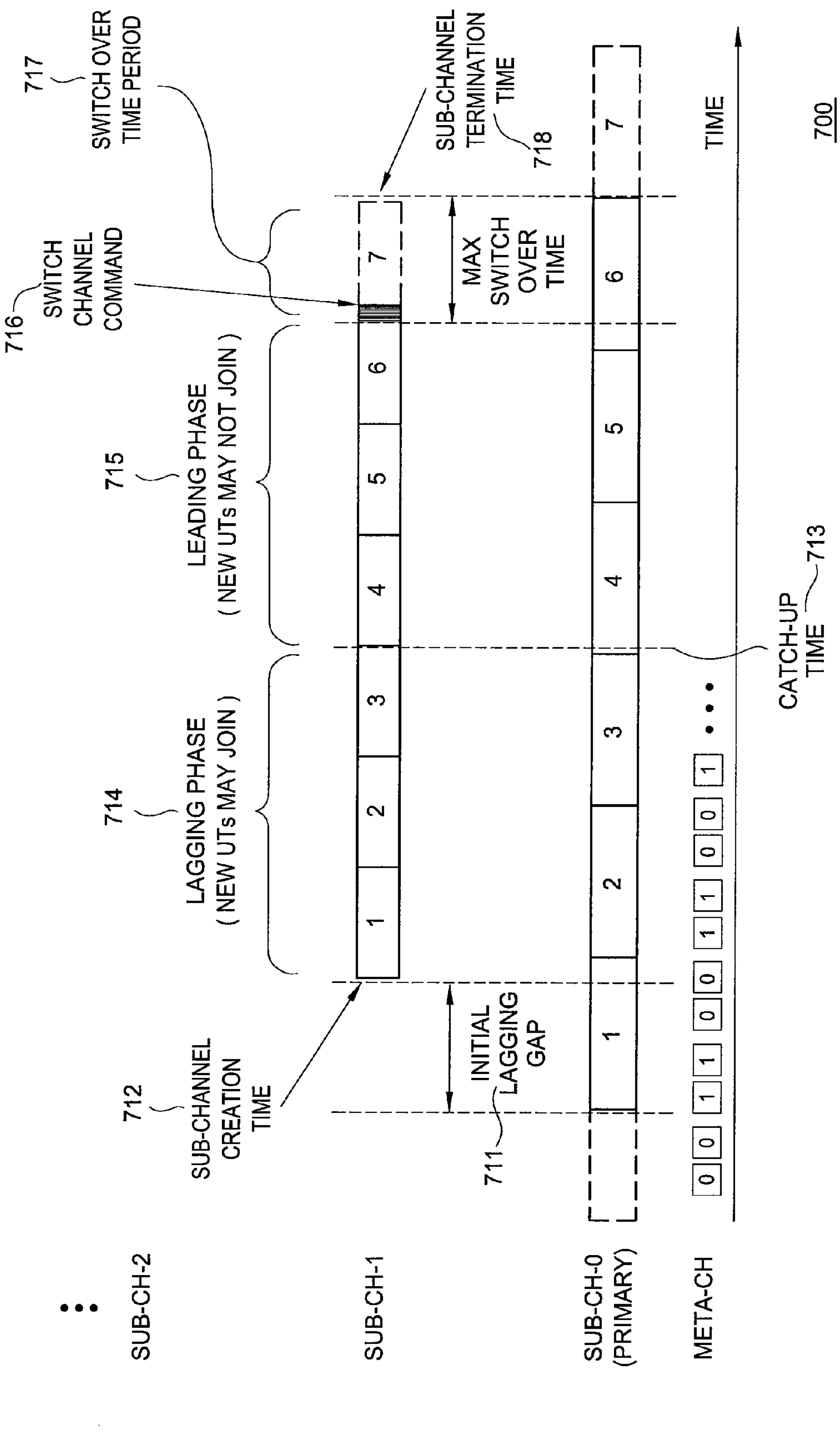
FIG. 7 depicts an exemplary timing diagram illustrating the timing of a primary sub-channel and an associated auxiliary sub-channel for purposes of illustrating sub-channel migration at a zapping accelerator.

An example of sub-channel migration from the perspective of the zapping accelerator is depicted and described with respect to FIG. 7. An exemplary method performed by a zapping accelerator to provide the sub-channel migration functions is depicted and described with respect to FIG. 8. An example of sub-channel migration from the perspective of a user terminal is depicted and described with respect to FIG. 9. An exemplary method performed by a user terminal to provide the sub-channel migration functions is depicted and described with respect to FIG. 10.

FIG. 7 depicts an exemplary timing diagram illustrating the timing of a primary sub-channel and an associated auxiliary sub-channel for purposes of illustrating sub-channel migration at a zapping accelerator. As depicted in FIG. 7, a media stream conveying content of the television channel includes GOPs (denoted using integers 1 through 7). A primary sub-channel (denoted as SUB-CH-0) is propagated toward user terminals. The primary sub-channel SUB-CH-0 is propagated using a first data rate (r). After an initial lagging gap (711), the zapping accelerator creates a first auxiliary sub-channel (denoted as SUB-CH-1). The creation time (712) of first auxiliary sub-channel SUB-CH-1 is T time units after the creation time of primary auxiliary sub-channel SUB-CH-0. The first auxiliary sub-channel SUB-CH-1 is propagated using a second data rate (R), where data rate R is greater than data rate r.

As depicted in FIG. 7, since second data rate R is greater than first data rate r, the GOP sizes of the respective GOPs of the first auxiliary sub-channel SUB-CH-1 are proportionally smaller than the corresponding GOP sizes of the respective GOPs of the primary sub-channel SUB-CH-0. Thus, over time, the first auxiliary sub-channel SUB-CH-1 changes from lagging primary sub-channel SUB-CH-0 to leading primary sub-channel SUB-CH-0. As depicted in FIG. 7, the first auxiliary sub-channel SUB-CH-1 catches up with primary sub-channel SUB-CH-0 at the time (713) at which the fourth GOP (denoted as GOP 4) begins to be sent on both the primary sub-channel SUB-CH-0 and the first auxiliary sub-channel SUB-CH-1.

The period of time before the time at which the first auxiliary sub-channel SUB-CH-1 catches the primary sub-channel SUB-CH-0 (beginning at the time at which the first auxiliary sub-channel is created) is denoted as a lagging phase (714). During lagging phase 714 of first auxiliary sub-channel SUB-CH-1, new user terminals may still join the multicast group of the first auxiliary sub-channel SUB-CH-1. The period of time after the time at which the first auxiliary sub-channel SUB-CH-1 catches the primary sub-channel SUB-CH-0 (and ending at a time at which the zapping accelerator sends a sub-channel migration command on the first auxiliary sub-channel) is denoted as a leading phase (715). During leading phase 715 of first auxiliary sub-channel SUB-CH-1, new user terminals may not join the multicast group of the first auxiliary sub-channel SUB-CH-1.

As described herein, during leading phase 715, any user terminals that belong to the multicast group of first auxiliary sub-channel SUB-CH-1 buffer data received on first auxiliary sub-channel SUB-CH-1. At a time after the time (713) at which the first auxiliary sub-channel SUB-CH-1 catches the primary sub-channel SUB-CH-0, the zapping accelerator generates a switch channel command (716) and sends the switch channel command 716 on first auxiliary sub-channel SUB-CH-1. The user terminal(s) joined to the multicast group of first auxiliary sub-channel SUB-CH-1 receive switch channel command 716 on first auxiliary sub-channel SUB-CH-1.

The user terminal(s) receiving switch channel command 716 begin the process to switch from first auxiliary sub-channel SUB-CH-1 to primary sub-channel SUB-CH-0. As depicted in FIG. 7, there is a switchover time period (717) during which the user terminal(s) receiving switch channel command 716 performs the process to switch from first auxiliary sub-channel SUB-CH-1 to primary sub-channel SUB-CH-0, which includes leaving the multicast group of the first auxiliary sub-channel SUB-CH-1 and joining the multicast group of primary sub-channel SUB-CH-0.

During switchover time period 717, the first auxiliary sub-channel SUB-CH-1 is still active. During switchover time period 717, the seventh GOP (GOP 7) is being propagated on first auxiliary sub-channel SUB-CH-1, and the sixth GOP (GOP 6) is being propagated on the primary sub-channel SUB-CH-1. The sixth GOP (GOP 6) was propagated on first auxiliary sub-channel SUB-CH-1 earlier than being propagated on primary sub-channel SUB-CH-1 (illustratively, during the leading phase 715, during which time each user terminal was buffering the sixth GOP for use by in continuing to display the television channel to the user while the user terminal performs the sub-channel migration from first auxiliary sub-channel SUB-CH-1 to primary sub-channel SUB-CH-0).

As depicted in FIG. 7, after the switchover time period 717, when all of the user terminals have migrated from the first auxiliary sub-channel SUB-CH-1 to the primary sub-channel SUB-CH-0, the zapping accelerator deactivates the first auxiliary sub-channel SUB-CH-1 (at a time that is denoted as sub-channel termination time 718), thereby releasing any network resources that were being consumed by the first auxiliary sub-channel SUB-CH-1. The sub-channel termination time 718 occurs at approximately the same time at which the zapping accelerator sends the seventh GOP (GOP 7) on primary sub-channel SUB-CH-0, such that user terminals that are migrated from the first auxiliary sub-channel SUB-CH-1 to the primary sub-channel SUB-CH-0 can display the content of the television channel.

As described herein, each user terminal that was migrated from first auxiliary sub-channel SUB-CH-1 to primary sub-channel SUB-CH-0 can display the content of the television channel by using the packets of the sixth GOP that the user terminals received on the first auxiliary sub-channel SUB-CH-1 and buffered during leading phase 715 and then using the packets of the seventh GOP that the user terminals receive on the primary sub-channel after being migrated to the primary sub-channel. Thus, each user terminal that was migrated from first auxiliary sub-channel SUB-CH-1 to primary sub-channel SUB-CH-0 can display the content of the television channel without any impact to the users.

Figure 8:
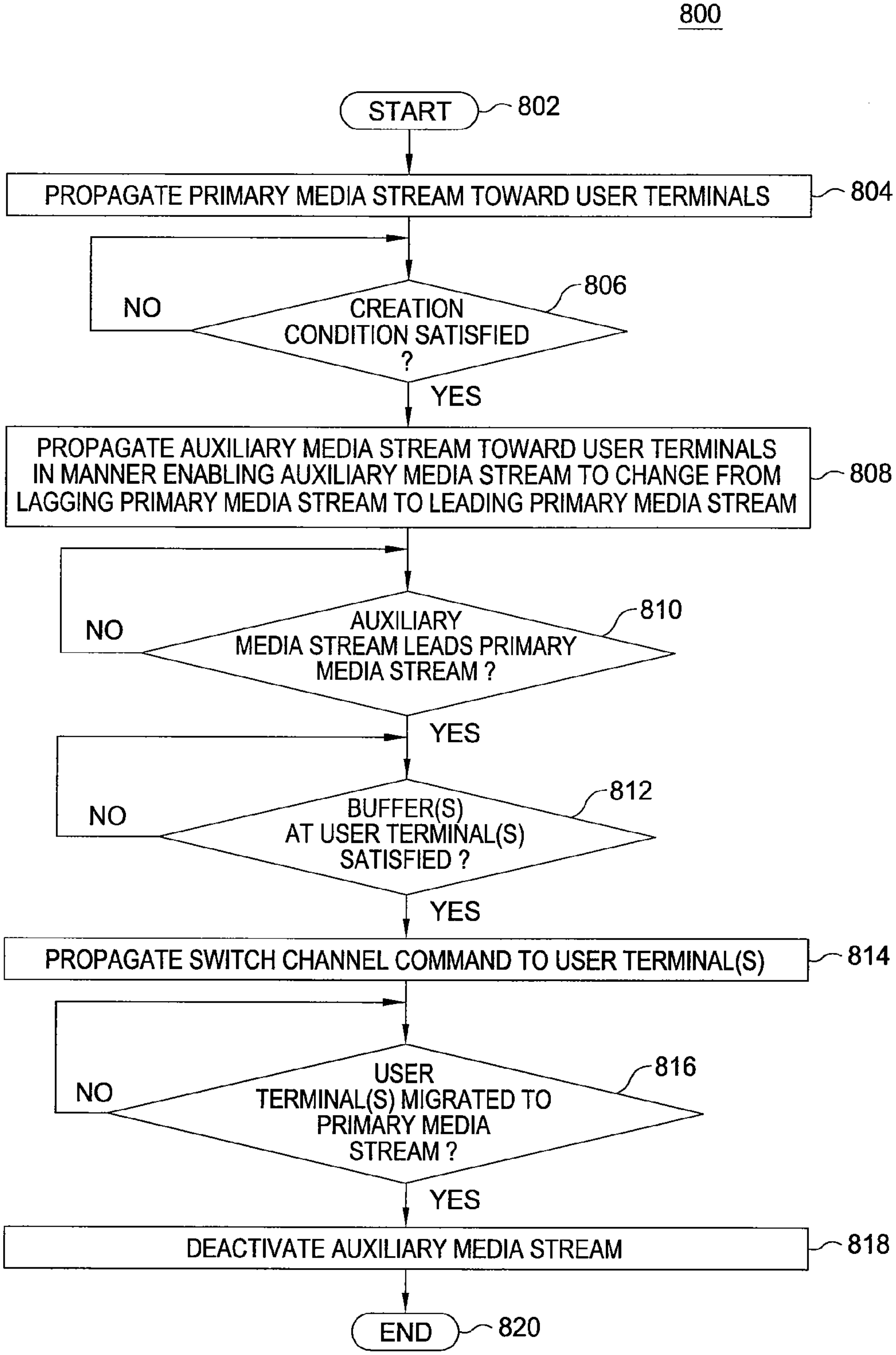
FIG. 8 depicts an exemplary method adapted to be performed by a zapping accelerator for performing a sub-channel migration operation.

FIG. 8 depicts an exemplary method adapted to be performed by a zapping accelerator for performing a sub-channel migration operation. Specifically, method 800 of FIG. 8 includes a method for selecting one of a plurality of media streams using information conveyed in a meta channel. Although depicted and described as being performed serially, at least a portion of the steps of method 800 may be performed contemporaneously, or in a different order than depicted and described with respect to FIG. 8. The method 800 begins at step 802 and proceeds to step 804.

At step 804, a primary media stream is propagated toward user terminals.

At step 806, a determination is made as to whether a creation condition is satisfied.

The creation condition may be any condition that is indicative that an auxiliary media stream should also be propagated toward user terminals. In one embodiment, the determination as to whether the creation condition is satisfied is a determination as to whether a time shift has been satisfied. In one embodiment, the determination as to whether the creation condition is satisfied is a determination as to whether at least one user terminal requests creation of an auxiliary media stream. The creation condition may be any other condition which may be used to determine whether or not an auxiliary media stream should be generated.

If the creation condition is not satisfied, method 800 returns to step 806. In other words, the zapping accelerator continues to propagate the primary media stream toward the user terminals while waiting for detection of an indication that a creation condition has been satisfied (i.e., the zapping accelerator loops within step 806 until a creation condition is satisfied). If the creation condition is satisfied, method 800 proceeds to step 808.

At step 808, an auxiliary media stream is propagated toward the user terminals. The auxiliary media stream is propagated toward the user terminals in a manner enabling the auxiliary media stream to switch from lagging the primary media stream to leading the primary media stream (e.g., by using a faster data rate for the auxiliary media stream, using packet discarding, and the like).

At step 810, a determination is made as to whether the auxiliary media stream leads the primary media stream. If the auxiliary media stream does not lead the primary media stream, method 800 returns to step 810 (i.e., the zapping accelerator continues to propagate the media streams while waiting for the auxiliary media stream to catch up to the primary media stream). If the auxiliary media stream leads the primary media stream, method 800 proceeds to step 812.

At step 812, a determination is made as to whether jitter buffer(s) at the user terminal(s) is satisfied.

The user terminal(s) includes any user terminal(s) currently joined to a multicast group of the auxiliary media stream. As shown in FIG. 7, the zapping accelerator does not require any specific knowledge about buffering of data on the user terminal(s); rather, the zapping accelerator only needs information sufficient for a determination that any user terminal(s) which may be using the auxiliary media stream have received and buffered enough data to be able to perform a seamless migration from the auxiliary media stream to the primary media stream.

If the jitter buffer(s) at the user terminal(s) are not satisfied, method 800 remains at step 812 (i.e., the zapping accelerator continues to propagate the media streams while waiting for a time sufficient for any user terminals which may be using the auxiliary media stream have received and buffered enough data). If the jitter buffer(s) at user terminal(s) are not satisfied, method 800 proceeds to step 814.

At step 814, a media stream migration command is propagated to the user terminal(s) that are using the auxiliary media stream. The media stream migration command may be provided as a packet within the auxiliary media stream.

At step 816, a determination is made as to whether the user terminal(s) that are using the auxiliary media stream have migrated to the primary media stream. As shown in FIG. 7, the zapping accelerator does not require any specific knowledge about whether the user terminal(s) that were using the first auxiliary media stream have migrated to the primary media stream; rather, the zapping accelerator may simply wait a length of time deemed to be sufficient for user terminals to perform the multicast leave and join operations required to migrate to the primary media stream.

If the user terminal(s) have not migrated to the primary media stream (e.g., a sufficient length of time for the migration has not yet elapsed), method 800 remains at step 816 (i.e., the zapping accelerator continues to propagate the media streams while waiting for a time sufficient for any user terminals which may be using the auxiliary media stream to have completed migration to the primary media stream). If the user terminal(s) have migrated to the primary media stream (e.g., a sufficient length of time for the migration has passed), method 800 proceeds to step 818.

At step 818, the first auxiliary media stream is deactivated (and, thus, the associated first auxiliary sub-channel is deactivated). The primary media stream continues to propagate the content of that television channel and one or more other auxiliary media streams associated with the primary media stream may also continue to propagate the content of that television channel (either lagging or leading the primary media stream, depending on when the auxiliary media stream was created).

At step 820, method 800 ends. Although depicted and described as ending (for purposes of clarity), method 800 may continue to be repeated as new auxiliary media streams are activated and existing auxiliary media streams are deactivated.

Figure 9:
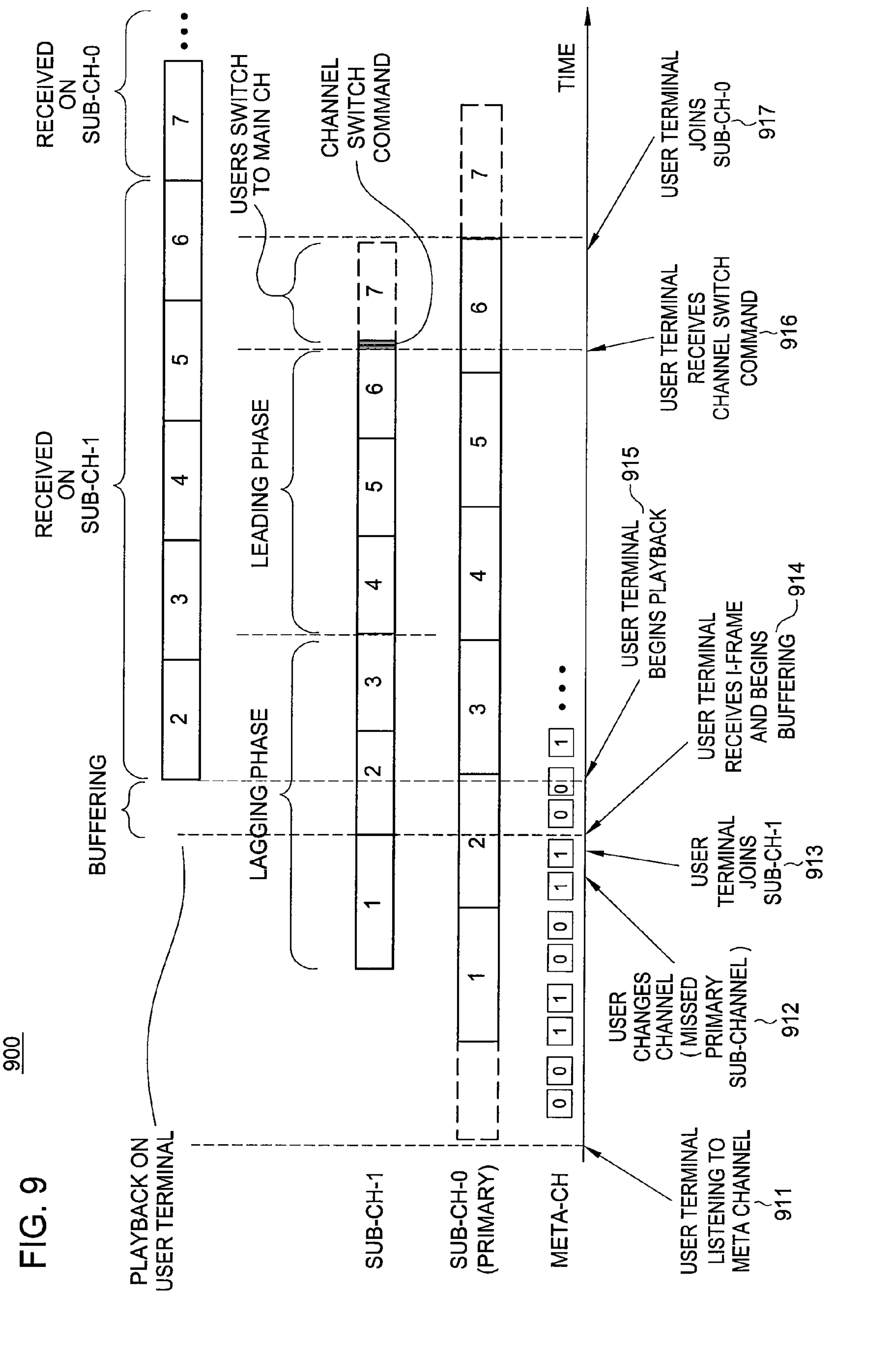
FIG. 9 depicts an exemplary timing diagram illustrating the timing of the primary sub-channel and the associated auxiliary sub-channel of FIG. 7 for purposes of illustrating sub-channel migration at a user terminal.

FIG. 9 depicts an exemplary timing diagram illustrating the timing of the primary sub-channel and the associated auxiliary sub-channel of FIG. 7 for purposes of illustrating sub-channel migration at a user terminal. The timing of the primary sub-channel SUB-CH-0 and first auxiliary sub-channel SUB-CH-0 of FIG. 9 is the same as the timing of the primary sub-channel SUB-CH-0 and first auxiliary sub-channel SUB-CH-0 of FIG. 7, respectively.

At a first point in time (denoted as 911), a user terminal is listening to a meta channel.

At a second point in time (denoted as 912), some time after the first point in time, a user selects a television channel. For example, the user may change the television channel via a remote control.

At a third point in time (denoted as 913), after some delay from the second point in time (during which the user terminal determines which of the auxiliary sub-channels to select), the user terminal joins the multicast group of the selected sub-channel (illustratively, the user terminal joins the multicast group of first auxiliary sub-channel SUB-CH-1).

At a fourth point in time (denoted as 914), after some delay from the third point in time (i.e., waiting for the beginning of the next GOP on the first auxiliary sub-channel SUB-CH-1), the user terminal receives the next I-frame available on the first auxiliary sub-channel (illustratively, the I-frame of the second GOP). The user terminal also begins buffering the data received on first auxiliary sub-channel SUB-CH-1.

At a fifth point in time (denoted as 915), after some delay from the fourth point in time (during which the user terminal is buffering frames that are received on first auxiliary sub-channel SUB-CH-1), the user terminal begins to display the content of the selected channel (i.e., the user terminal begins the playback of the content of the television channel selected by the user).

At a sixth point in time (denoted as 916), after some delay from the fifth point in time (during which the first auxiliary sub-channel SUB-CH-1 changes from lagging the primary sub-channel SUB-CH-0 in time to leading the primary sub-channel SUB-CH-0 in time), the user terminal receives a switch channel command on first auxiliary sub-channel SUB-CH-1. As depicted in FIG. 7 and FIG. 9, the switch channel command is received before the start of the seventh GOP on first auxiliary sub-channel SUB-CH-1.

At a seventh point in time (denoted as 917), after some delay from the sixth point in time (during which the user terminal is switching from the first auxiliary sub-channel SUB-CH-1 to primary sub-channel SUB-CH-0 by leaving the multicast group of first auxiliary sub-channel SUB-CH-1 and joining the multicast group of primary sub-channel SUB-CH-0), the user terminal joins the primary sub-channel SUB-CH-0.

As described with respect to FIG. 7, in order to seamlessly switch the user terminal from the first auxiliary sub-channel SUB-CH-1 to the primary sub-channel SUB-CH-0 in a manner transparent to the user, the user terminal maintains a jitter buffer for storing data received on first auxiliary sub-channel SUB-CH-1 (before such data is available on primary sub-channel SUB-CH-0) such that playout on the user terminal may continue from the jitter buffer while the user terminal is in the process of switching from first auxiliary sub-channel SUB-CH-1 to primary sub-channel SUB-CH-0.

As depicted in FIG. 9, the user terminal receives the second through sixth GOPs on the first auxiliary sub-channel SUB-CH-1, and receives the seventh GOP (and subsequent GOPs) on the primary sub-channel SUB-CH-0. As further depicted in FIG. 9, the fourth through sixth GOPs were made to be available on the first auxiliary sub-channel SUB-CH-1 before such GOPs were available on primary sub-channel SUB-CH-0 (e.g., using an increased data rate for the first auxiliary sub-channel, or any other means of achieving this result).

Thus, although the user terminal is not joined to any sub-channel while the sixth GOP is being propagated on primary sub-channel SUB-CH-0, seamless playout of the content of the television channel continues using the sixth GOP stored in the jitter buffer on the user terminal (since the sixth GOP was made to arrive at the user terminal on the first auxiliary sub-channel in advance of the time at which the sixth GOP was available on the primary sub-channel.

Figure 10:
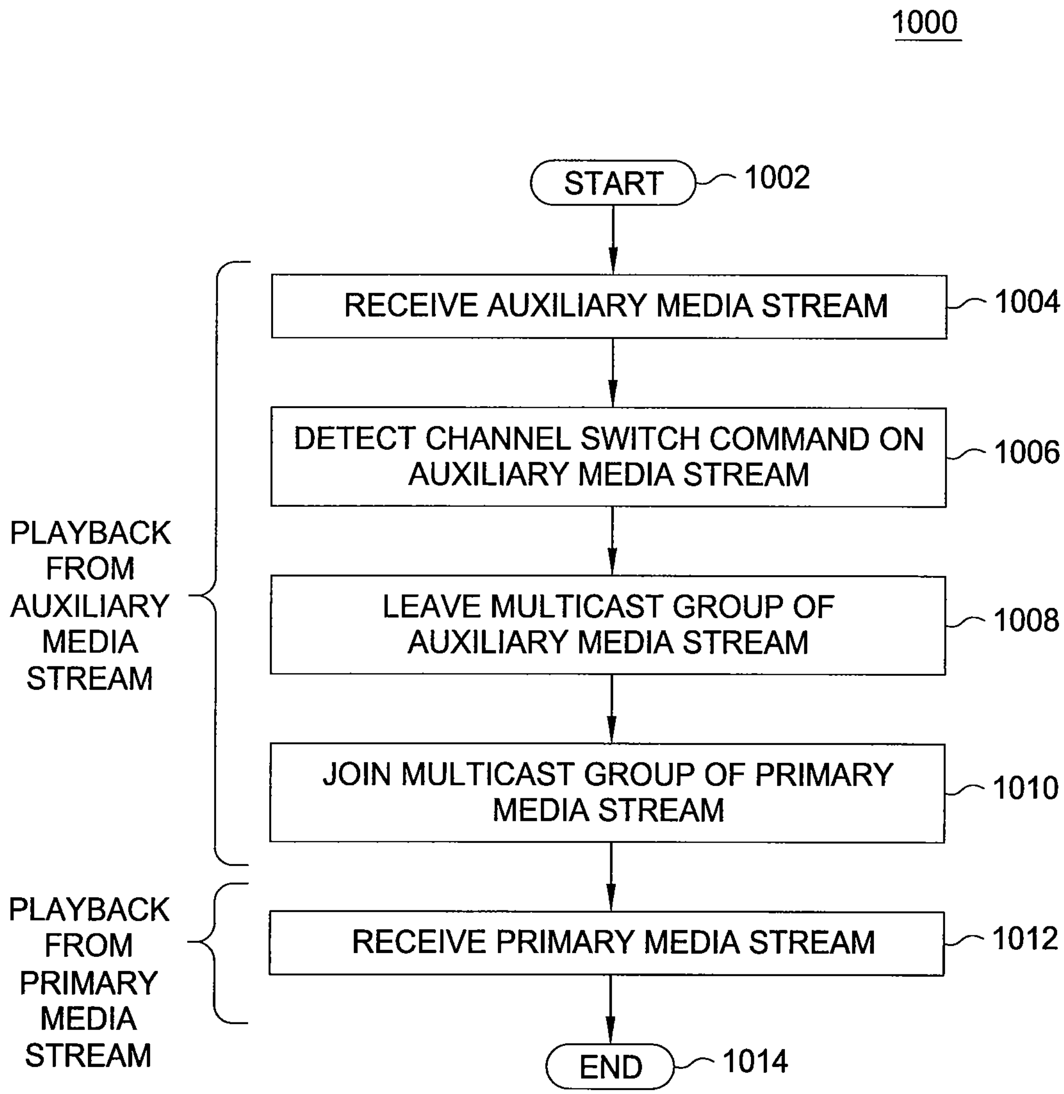
FIG. 10 depicts an exemplary method adapted to be performed by a user terminal for performing a sub-channel migration operation.

FIG. 10 depicts an exemplary method adapted to be performed by a user terminal for performing a sub-channel migration operation. Specifically, method 1000 of FIG. 10 includes a method for migrating from an auxiliary media stream to a primary media stream. Although depicted and described as being performed serially, at least a portion of the steps of method 1000 may be performed contemporaneously, or in a different order than depicted and described with respect to FIG. 10. The method 1000 begins at step 1002 and proceeds to step 1004.

At step 1004, the user terminal receives an auxiliary media stream. At step 1006, the user terminal detects a switch channel command on the auxiliary media stream. At step 1008, the user terminal leaves the multicast group of the auxiliary media stream. At step 1010, the user terminal joins the multicast group of a primary media stream associated with the auxiliary media stream. At step 1012, the user terminal receives the primary media stream. At step 1014, method 1000 ends.

As described herein, the auxiliary and primary media streams convey the content of a television channel. During steps 1004-1010, playback of the content of the television channel at the user terminal is performed using frames received on the auxiliary media stream. During step 1012 (and for any time thereafter, until the user changes the channel), playback of the content of the television channel at the user terminal is performed using frames received on the primary media stream.

Figure 11:
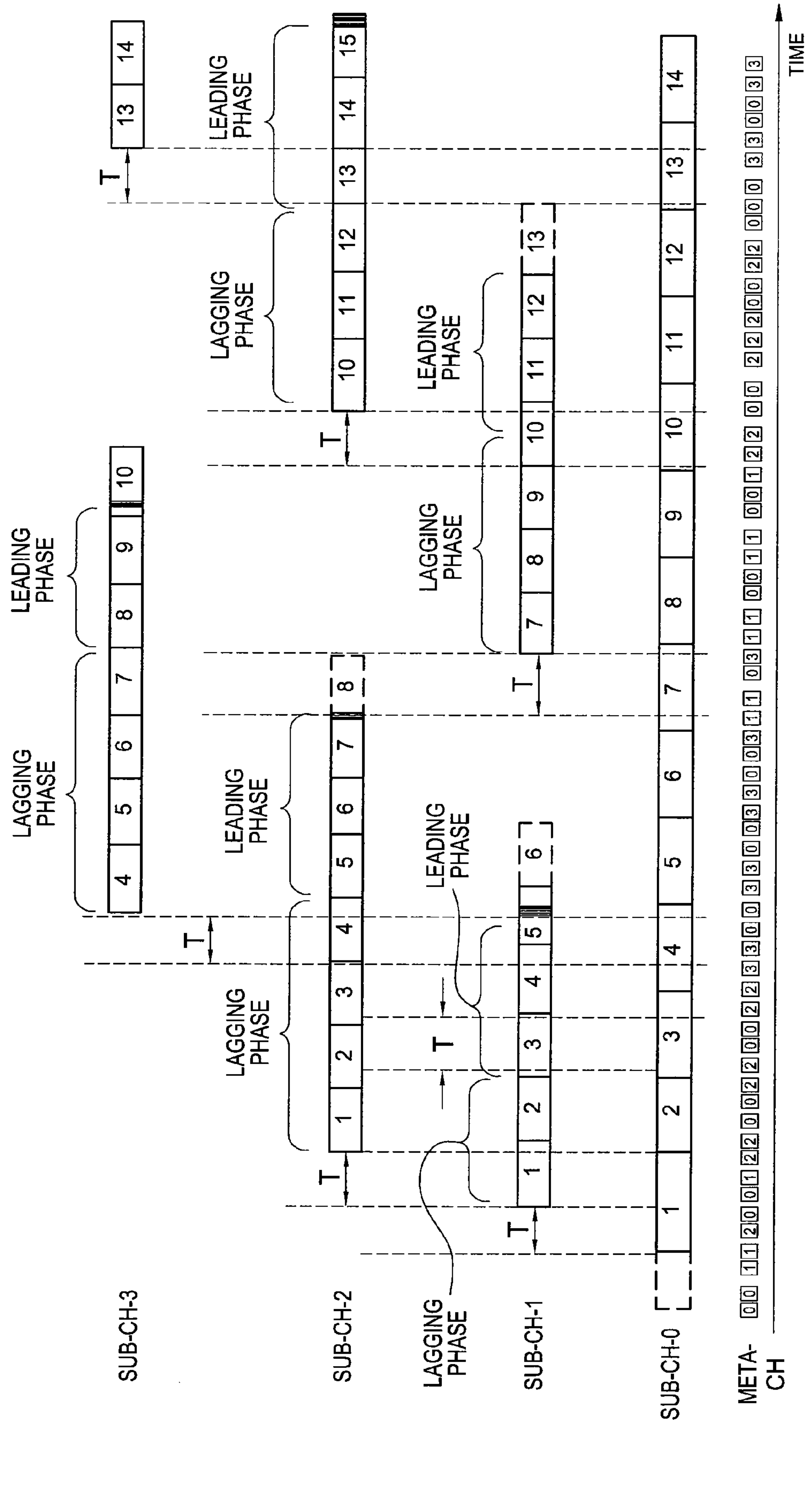
FIG. 11 depicts an exemplary timing diagram illustrating the timing of a primary sub-channel and associated auxiliary sub-channels for purposes of illustrating sub-channel migration in the presence of multiple auxiliary sub-channels.

FIG. 11 depicts an exemplary timing diagram illustrating the timing of a primary sub-channel and associated auxiliary sub-channels for purposes of illustrating sub-channel migration in the presence of multiple auxiliary sub-channels. As depicted in FIG. 11, there are three auxiliary sub-channels that are active and inactive at different points in time. The different auxiliary sub-channels are activated when needed in order to reduce the channel zapping response time for one or more user terminals. After the user terminals join an auxiliary sub-channel, the user terminals are then eventually migrated to the primary sub-channel and the auxiliary sub-channel is deactivated, only to be reactivated again later in order to reduce the channel zapping response time for other user terminals.

As depicted in FIG. 11, each auxiliary sub-channel has associated lagging and leading phases or each time period during which the auxiliary sub-channel is active. Additionally, in many instances, deactivation of one of the auxiliary sub-channels substantially coincides with activation of a different one of the auxiliary sub-channels. For example, second auxiliary sub-channel SUB-CH-2 is deactivated (at the end of GOP 8 on SUB-CH-2) at substantially the same time that first auxiliary sub-channel SUB-CH-1 is reactivated (at the start of GOP 7 on SUB-CH-1). The migration of user terminals from each of the auxiliary sub-channels to the primary sub-channel may be performed in a manner similar to sub-channel migration operations depicted and described herein with respect to FIG. 7-FIG. 10.

Although primarily depicted and described herein with respect to primary/auxiliary sub-channels conveying respective primary/auxiliary media streams for a television channel, the primary/auxiliary sub-channels may be conveying respective primary/auxiliary media streams for various other types of content. For example, the zapping acceleration functions depicted and described herein may be applied for use in multicast distribution of any other type of content (e.g., for video-on-demand delivery, webcasts, and the like, as well as various combinations thereof).

Although primarily depicted and described with respect to constant bit rate (CBR) media streams (e.g., where the primary media stream has a rate r and auxiliary media streams may have rate r or R), the channel zapping acceleration functions depicted and described herein is oblivious to bit-rate variability and, thus, may be applied for use with variable rate media streams. For example, in embodiments in which auxiliary sub-channels convey higher rate media streams than the primary sub-channel, the zapping accelerator may speed-up transmission of the original media stream by a factor of R/r regardless of the rate at which the original media stream is received such that, in the case that the bit-rate of the original media stream is upper-bounded by r the maximal bit-rate of the auxiliary HRSs is R.

Figure 12:
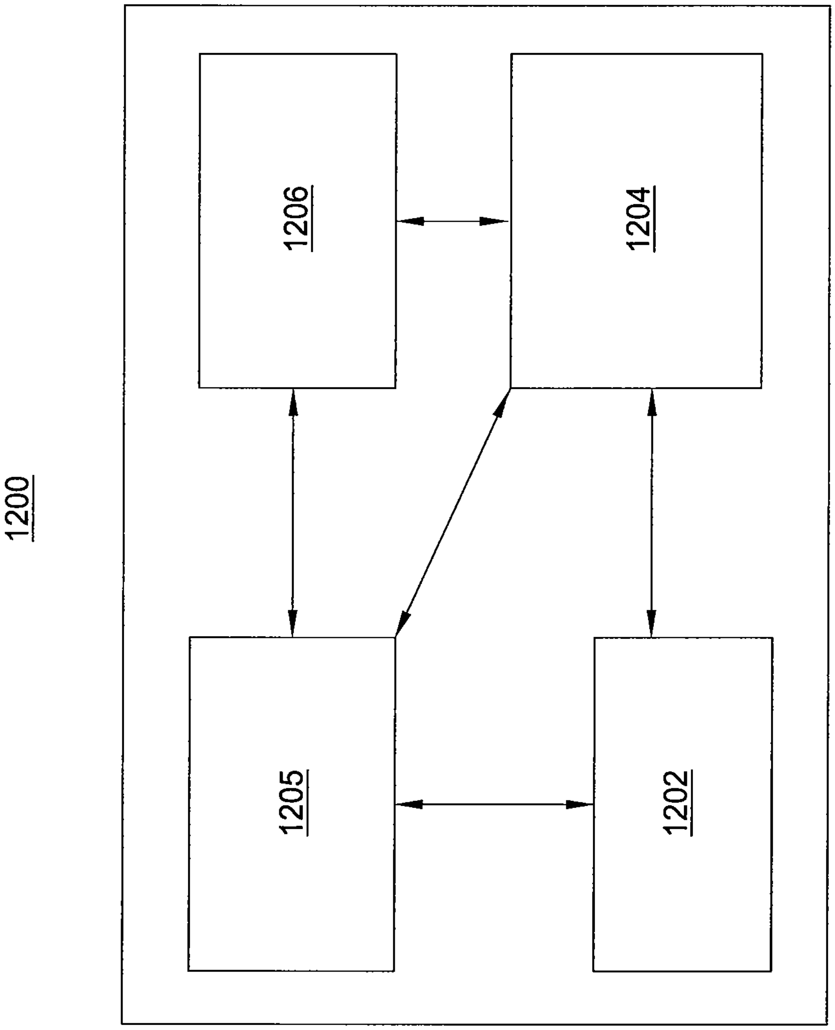
FIG. 12 depicts a high-level block diagram of a general-purpose computer suitable for use in performing the functions described herein.

FIG. 12 depicts a high-level block diagram of a general-purpose computer suitable for use in performing the functions described herein. As depicted in FIG. 12, system 1200 comprises a processor element 1202 (e.g., a CPU), a memory 1204, e.g., random access memory (RAM) and/or read only memory (ROM), a channel zapping acceleration module 1205, and various input/output devices 1206 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present channel zapping acceleration process 1205 can be loaded into memory 1204 and executed by processor 1202 to implement the functions as discussed above. As such, channel zapping acceleration process 1205 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for improving a channel change response time, comprising:

generating, from an original media stream conveying media content, at least one auxiliary media stream, each of the at least one auxiliary media stream conveying the media content of the original media stream, each of the at least one auxiliary media stream being offset in time with respect to the original media stream wherein, for each of the at least one auxiliary media stream, the auxiliary media stream is generated in response to a channel change request received from one of at least one user terminal;

propagating the media streams toward at least one user terminal using respective multicast groups;

generating a meta channel associated with the media streams for conveying information adapted for use in selecting one of the media streams to thereby improve the channel change response time; and propagating the meta channel toward the at least one user terminal.

2. The method of claim 1, wherein the meta channel is propagated using a multicast group.

3. The method of claim 1, wherein the multicast groups conveying the media streams comprise respective multicast addresses.

4. The method of claim 1, wherein the information adapted for use in selecting one of the media streams explicit identifies the one of the media streams tending to reduce the channel change response time.

5. The method of claim 1, wherein the information adapted for use in selecting one of the media streams comprises information indicative of times between respective reference frames of pairs of the media streams adjacent in time.

6. The method of claim 1, wherein the original media stream comprises a first data rate, wherein the at least one auxiliary data stream comprises at least one second data rate, each of the at least one second data rate being greater than the first data rate.

7. An apparatus for improving a channel change response time, comprising:

means for generating, from an original media stream conveying media content, at least one auxiliary media stream, each of the at least one auxiliary media stream conveying the media content of the original media stream, each of the at least one auxiliary media stream being offset in time from the original media stream wherein, for each of the at least one auxiliary media stream, the auxiliary media stream is generated in response to a channel change request received from one of at least one user terminal;

means for propagating the media streams toward at least one user terminal using respective multicast groups;

means for generating a meta channel associated with the media streams for conveying information adapted for use in selecting one of the media streams to thereby improve the channel change response time; and means for propagating the meta channel toward the at least one user terminal.

8. A method for improving a channel change response time, comprising:

supporting a plurality of media streams including an original media stream and at least one auxiliary media stream, each of the at least one auxiliary media stream conveying the media content of the original media stream, each of the at least one auxiliary media stream being offset in time from the original media stream wherein, for each of the at least one auxiliary media stream, the auxiliary media stream is generated in response to a channel change request received from one of at least one user terminal;

in response to a channel change request of a user terminal, selecting one of the media streams to thereby reduce the channel change response time for the user terminal; and performing an action adapted to enable the end user terminal to receive the selected one of the media streams.

9. The method of claim 8, wherein supporting the media streams comprises: receiving the original media stream and receiving the at least one auxiliary media stream.

10. The method of claim 8, wherein supporting the media streams comprises: receiving the original media stream and generating the at least one auxiliary media stream using the original media stream.

11. The method of claim 10, wherein the at least one auxiliary media stream is generated in response to a channel change request received from a user terminal.

12. The method of claim 8, wherein performing the action comprises: propagating, toward the user terminal, information adapted for use by the user terminal in switching to a multicast group associated with the selected media stream.

13. The method of claim 8, wherein performing the action comprises: rewriting a multicast address of the multicast group for the selected media stream for automatically switching the user terminal to the multicast group for the selected media stream in a manner transparent to the user terminal.

14. The method of claim 8, wherein the original media stream comprises a first data rate, wherein the at least one auxiliary data stream comprises at least one second data rate, each of the at least one second data rate being greater than the first data rate.

15. An apparatus, comprising:

means for supporting a plurality of media streams including an original media stream and at least one auxiliary media stream, each of the at least one auxiliary media stream conveying the media content of the original media stream, each of the at least one auxiliary media stream being offset in time from the original media stream wherein, for each of the at least one auxiliary media stream, the auxiliary media stream is generated in response to a channel change request received from one of at least one user terminal;

means for selecting, in response to a channel change request from a user terminal, one of the media streams to thereby reduce a channel change response time for the user terminal; and performing an action adapted to enable the end user terminal to receive the selected one of the media streams.

16. A method for improving a channel change response time, comprising:

receiving, from a meta channel, information associated with a plurality of available media streams, the available media streams comprising an original media stream conveying content and at least one auxiliary media stream, each of the at least one auxiliary media stream conveying the content of the original media stream and being offset in time from the original media stream wherein, for each of the at least one auxiliary media stream, the auxiliary media stream is generated in response to a channel change request received from one of at least one user terminal; and selecting one of the media streams using the information from the meta channel, wherein the selected one of the media streams is selected to thereby reduce the channel change response time for the user terminal.

17. The method of claim 16, further comprising:

joining a multicast group associated with the meta channel in response to a channel change request received at the user terminal.

18. The method of claim 16, further comprising:

propagating, toward a media server, an indication of the media stream selected by the user terminal.

19. The method of claim 18, further comprising:

receiving a message including information adapted for use by the user terminal to receive the selected media channel.

20. The method of claim 19, wherein the information comprises a multicast address of the multicast group associated with the selected media stream.

21. The method of claim 20, further comprising:

joining the multicast group associated with the selected media stream using the multicast address of the multicast group.

22. The method of claim 18, further comprising:

receiving the selected media stream at the user terminal, wherein the selected media stream is received at the user terminal in response to an action performed by the media server in response to receiving the indication of the media stream selected by the user terminal; and presenting the media content conveyed by the selected media stream.

23. The method of claim 16, further comprising:

receiving the selected media stream at the user terminal; and presenting the media content conveyed by the selected media stream.

24. An apparatus for improving a channel change response time, comprising:

means for receiving, from a meta channel, information associated with a plurality of available media streams, the available media streams comprising an original media stream conveying content and at least one auxiliary media stream, each of the at least one auxiliary media stream conveying the content of the original media stream and being time-shifted with respect to the original media stream wherein, for each of the at least one auxiliary media stream, the auxiliary media stream is generated in response to a channel change request received from one of at least one user terminal; and means for selecting one of the media streams using the information of the meta channel, wherein the media stream is selected to thereby reduce the channel change response time for the user terminal.

* * * * *